(12) United States Patent
Asao

(10) Patent No.: US 6,538,352 B2
(45) Date of Patent: Mar. 25, 2003

(54) AUTOMOTIVE ALTERNATOR HAVING A RECTIFIER HEAT SINK AND VOLTAGE REGULATOR HEAT SINK INTEGRATED IN ONE SINGLE SUPPORT STRUCTURE

(75) Inventor: Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/838,255

(22) Filed: Apr. 20, 2001

(65) Prior Publication Data

US 2002/0053841 A1 May 9, 2002

(30) Foreign Application Priority Data

Nov. 8, 2000 (JP) ........................................ 2000-340220

(51) Int. Cl.⁷ ......................... H02K 7/00; H02K 11/00; H02K 7/02; H02K 9/00; H02K 7/32; H02K 3/24; H02K 5/18

(52) U.S. Cl. ..................... 310/68 D; 310/71; 310/68 C; 310/58; 310/64

(58) Field of Search .................. 310/68 D, 54, 310/58, 64, 52, 71, 68 C; 363/145

(56) References Cited

U.S. PATENT DOCUMENTS

| 4,232,238 A | * | 11/1980 | Saito et al. ................ 310/68 D |
| 4,799,309 A | * | 1/1989 | Cinzori et al. .................. 29/596 |
| 4,922,148 A | * | 5/1990 | Kitamura .................. 123/41.31 |
| 4,926,076 A | * | 5/1990 | Nimura et al. .................. 310/58 |
| 5,296,778 A | * | 3/1994 | Stroud ......................... 310/179 |
| 5,686,780 A | * | 11/1997 | Adachi et al. ............... 310/239 |
| 5,694,311 A | * | 12/1997 | Umeda et al. ................. 322/16 |
| 5,798,586 A | * | 8/1998 | Adachi ......................... 310/54 |
| 5,998,893 A | * | 12/1999 | Fowler et al. ............. 310/68 D |
| 6,020,662 A | * | 2/2000 | Chen et al. ..................... 310/52 |
| 6,060,802 A | * | 5/2000 | Masegi et al. ............... 310/239 |
| 6,081,054 A | * | 6/2000 | Kashihara et al. ............. 310/58 |
| 6,160,384 A | * | 12/2000 | Inaba et al. .................... 322/59 |
| 6,169,344 B1 | * | 1/2001 | Tsuruhara .............. 237/12.3 R |
| 6,208,058 B1 | * | 3/2001 | Taji et al. ..................... 310/201 |
| 6,326,715 B1 | * | 12/2001 | Asao et al. .................. 310/180 |
| 2002/0050750 A1 | * | 5/2002 | Oohashi et al. ........... 310/68 D |

FOREIGN PATENT DOCUMENTS

| JP | 8-10974 | 1/1996 | ............. H02K/9/19 |
| JP | 8-331773 | 12/1996 | ............. H02J/7/16 |

OTHER PUBLICATIONS

English language Abstract, JP 8–10974, filed Jan. 31, 1996.
English language Abstract, JP 8–331773, filed Dec. 13, 1996.

* cited by examiner

Primary Examiner—Thomas M. Dougherty
Assistant Examiner—Julio C. Gonzalez
(74) Attorney, Agent, or Firm—Sughrue Mion, PLLC

(57) ABSTRACT

A supporting member is an annular molded resin body integrating a brush holder and a rectifier circuit board. First and second heat sinks mounted with unidirectional conducting component packages constituting a rectifier and a voltage regulator circuit board constituting a voltage regulator are supported by the supporting member. The rectifier and the voltage regulator are mounted by fastening mounting screws that pass through mounting apertures of a mounting portion of the supporting member to a rear bracket.

6 Claims, 19 Drawing Sheets

AUTOMOTIVE ALTERNATOR HAVING A RECTIFIER HEAT SINK AND VOLTAGE REGULATOR HEAT SINK INTEGRATED IN ONE SINGLE SUPPORT STRUCTURE

This application is based on Application No. 2000-340220, filed in Japan on Nov. 8, 2000, the contents of which are hereby incorporated by reference.

BACKGROUND OF THE INVENTION

1. Field of the Invention

The present invention relates to an automotive alternator.

2. Description of the Related Art

FIG. 17 is a cross section showing a construction of a conventional automotive alternator, FIG. 18 is a rear end elevation of the conventional automotive alternator, FIG. 19 is a perspective showing a rotor used in the conventional automotive alternator, and FIG. 20 is a perspective showing a stator used in the conventional automotive alternator.

In FIGS. 17 to 20, the conventional automotive alternator is constructed by rotatably mounting a Lundell-type rotor 7 by means of a shaft 6 inside a case 3 constructed from an aluminum front bracket 1 and an aluminum rear bracket 2, and fixing a stator 8 to an inner wall surface of the case 3 so as to cover an outer circumferential side of the rotor 7.

The shaft 6 is rotatably supported in the front bracket 1 and the rear bracket 2. A pulley 4 is fastened to a first end of this shaft 6 such that rotational torque from an engine can be transmitted to the shaft 6 by means of a belt (not shown).

Slip rings 9 for supplying electric current to the rotor 7 are fixed to a second end of the shaft 6, and a pair of brushes 10 are housed in a brush holder 11 disposed inside the case 3 such that the pair of brushes 10 slide in contact with the slip rings 9. A voltage regulator 18 for adjusting the magnitude of an alternating voltage generated in the stator 8 is fixed by adhesive to a regulator heat sink 17 fitted onto the brush holder 11. A rectifier 12 that is electrically connected to the stator 8 and converts alternating current generated in the stator 8 into direct current is mounted inside the case 3.

The rotor 7 is constituted by a rotor coil 13 for generating magnetic flux on passage of an electric current, and a pair of first and second pole cores 20 and 21 disposed so as to cover the rotor coil 13, magnetic poles being formed in the first and second pole cores 20 and 21 by magnetic flux generated in the rotor coil 13. The pair of first and second pole cores 20 and 21 are made of iron, each has a plurality of first and second claw-shaped magnetic poles 22 and 23 disposed on an outer circumferential perimeter at even pitch in a circumferential direction so as to project axially, and the first and second pole cores 20 and 21 are fixed to the shaft 6 facing each other such that the first and second claw-shaped magnetic poles 22 and 23 intermesh. In addition, centrifugal fans 5 are fixed to first and second axial ends of the rotor 7.

The stator 8 is constituted by a stator core 15, and a stator winding 16 formed by winding a conducting wire into this stator core 15, electric current being generated in the stator winding 16 by changes in the magnetic flux from the rotor 7 accompanying rotation of the rotor 7. The stator core 15 is formed into a cylindrical shape, and a plurality of slots 15a having grooves lying parallel to an axial direction are disposed at even angular pitch in a circumferential direction so as to open towards an inner circumferential side. The stator winding 16 is formed into a generally cylindrical shape by winding and stacking copper wires (conductor wires) having a circular cross section coated with electrical insulation into a wave shape, and is mounted to the stator core 15 by inserting the copper wires into each of the slots 15a from axially outside while bending a first coil end portion thereof towards an inner circumferential side.

Next, the construction of the rectifier 12 and the voltage regulator 18 will be explained with reference to FIGS. 22 to 28.

The brush holder 11 is made of an electrically-insulating resin, and is formed integrally with an annular shaft insertion portion 30, a circuit housing portion 31, a connector portion 32, and a mounting portion 33. An insert conductor group is insert molded into the brush holder 11, constituting wiring for component parts, also constituting connection terminals protruding out into the connector portion 32, and further constituting rectifier connection terminals 34, etc., functioning as electrical joint portions for the rectifier 12. The voltage regulator 18 is constructed by securing a voltage regulator circuit board (not shown) mounted with electronic components such as IC chips onto the regulator heat sink 17 using adhesive. The voltage regulator 18 is mounted in the circuit housing portion 31 by fitting the regulator heat sink 17 into the circuit housing portion 31 and sealing edge portions of the regulator heat sink 17 to the circuit housing portion 31. The voltage regulator circuit board of the voltage regulator 18 is housed inside the circuit housing portion 31 and sealed in using a resin. Brush holder mounting apertures 33a are disposed at first and second ends of the mounting portion 33.

The rectifier 12 is constituted by horseshoe-shaped first and second heat sinks 37 and 38 upon which are disposed first and second unidirectional conducting component packages 35 and 36, respectively, and a horseshoe-shaped rectifier circuit board 39. Each of the first unidirectional conducting component packages 35 is formed into a generally rectangular parallelepiped shape by molding a first diode 35a using a first electrically-insulating resin portion 35d, each of the first diodes 35a functioning as a semiconductor component constructed by joining an n-type semiconductor and a p-type semiconductor into a pn junction, a first heat-dissipating copper tab 35b being joined to the n-type semiconductor and a first diode connection terminal 35c being joined to the p-type semiconductor. Each of the second unidirectional conducting component packages 36 is formed into a generally rectangular parallelepiped shape by molding a second diode 36a using a second electrically-insulating resin portion 36d, each of the second diodes 36a functioning as a semiconductor component constructed by joining an n-type semiconductor and a p-type semiconductor into a pn junction, a second heat-dissipating copper tab 36b being joined to the p-type semiconductor and a second diode connection terminal 36c being joined to the n-type semiconductor. Eight first unidirectional conducting component packages 35 are arranged in a circumferential direction with the first heat-dissipating copper tabs 35b joined to a main surface of the first heat sink 37, and a plurality of heat-dissipating fins 37a are disposed in a radial pattern on a rear surface of the first heat sink 37. Similarly, eight second unidirectional conducting component packages 36 are arranged in a circumferential direction with the second heat-dissipating copper tabs 36b joined to a main surface of the second heat sink 38. In the rectifier circuit board 39, an insert conductor group is formed by insert molding and constitutes first rectifier circuit board connection terminals 39b functioning as electrical joint portions for the first and second diode connection terminals 35c and 36c of the first and second unidirectional conducting component packages 35 and 36 and second rectifier circuit board connection terminals 39c functioning as electrical joint portions for the voltage regulator 18. In addition, rectifier circuit board mounting apertures 39a are disposed at first and second end portions and a central portion of the rectifier circuit board 39. Moreover, one of the rectifier circuit board mounting apertures 39a is used as an output terminal for the rectifier 12.

The rectifier 12 is constructed by disposing the first and second rectifier heat sinks 37 and 38 coaxially such that main surfaces thereof are positioned in a common plane, disposing the rectifier circuit board 39 on the main surfaces of the first and second rectifier heat sinks 37 and 38, and joining the first and second diode connection terminals 35c and 36c of the first and second unidirectional conducting component packages 35 and 36 to the first rectifier circuit board connection terminals 39b of the rectifier circuit board 39. Electrical insulation of the first and second rectifier heat sinks 37 and 38 is ensured by electrically-insulating bushes 40.

Here, the brush holder 11 is secured to an inner wall surface of the rear bracket 2 by mounting screws (not shown) that pass through the brush holder mounting apertures 33a of the brush holder mounting portion 33, and the rectifier 12 is secured to an inner wall surface of the rear bracket 2 by mounting screws (not shown) that pass through the rectifier circuit board mounting apertures 39a. The brush holder 11 and the rectifier 12 are disposed in an annular shape surrounding the shaft 6. Thus, the second heat-dissipating copper tabs 36b of the second unidirectional conducting component packages 36 of the rectifier 12 are electrically connected to the rear bracket 2 through the second heat sink 38 and grounded.

The voltage regulator 18 and the rectifier 12 are electrically connected by the connection of the rectifier assembly connection terminals 34 and the second rectifier circuit board connection terminals 39c. Output wires and neutral point lead wires of the stator winding 16 are each connected to the second rectifier circuit board connection terminals 39b of the rectifier circuit board 39, constituting the circuit shown in FIG. 21. Moreover, the rectifier 12 is constituted by first and second rectifier sets 12a and 12b, each including a bridge circuit constituted by four first unidirectional conducting component packages 35 (first diodes 35a) and four second unidirectional conducting component packages 36 (second diodes 36a). Thus, the alternating-current outputs of first and second three-phase alternating-current windings 16a and 16b constituting the stator winding 16 undergo three-phase full-wave rectification by the first and second rectifier sets 12a and 12b, respectively, and are then combined. Because ripple currents flowing through the neutral points of the first and second three-phase alternating-current windings 16a and 16b are picked up, output is improved.

In a conventional automotive alternator constructed in this manner, an electric current is supplied from a battery (not shown) through the brushes 10 and the slip rings 9 to the rotor coil 13, generating a magnetic flux. The first claw-shaped magnetic poles 22 on the first pole core 20 are magnetized into North-seeking (N) poles by this magnetic flux, and the second claw-shaped magnetic poles 23 on the second pole core 21 are magnetized into South-seeking (S) poles. Rotational torque from the engine is transmitted to the shaft 6 through the belt and the pulley 4, rotating the rotor 7. Thus a rotating magnetic field is imparted to the stator winding 16, generating an electromotive force in the stator winding 16. This alternating-current electromotive force passes through the rectifier 12 where it is converted into direct current and the magnitude thereof is regulated by the voltage regulator 18, charging the battery.

Now, the rotor coil 13, the stator winding 16, the rectifier 12, and the voltage regulator 18 continuously generate heat during power generation, and in an alternator having a rated output current in the 100A class, they generate heat of 60W, 500W, 120W, and 6W, respectively, at a rotational speed showing high temperature.

Thus, in order to cool the heat generated by power generation, front-end and rear-end air intake apertures 1a and 2a and front-end and rear-end air discharge apertures 1b and 2b are disposed in the front bracket 1 and the rear bracket 2.

At the rear end, external air is sucked in through the rear-end air intake apertures 2a disposed facing the first rectifier heat sink 37 of the rectifier 12 and the regulator heat sink 17 of the voltage regulator 18, respectively, due to the rotation of the centrifugal fans 5, then flows radially inwards along the heat-dissipating fins of the first rectifier heat sink 37 and the regulator heat sink 17 to an inner circumferential edge of the first rectifier heat sink 37 and the regulator heat sink 17, next flows in an axial direction to the rotor 7, and is then deflected centrifugally by the centrifugal fans 5, cooling a rear-end coil end group 16r of the stator winding 16 before being expelled to the outside through the rear-end air discharge apertures 2b. At this time, the heat generated in the first unidirectional conducting component packages 35 is transferred from the first heat-dissipating copper tabs 35b to the first rectifier heat sink 37 and is dissipated from the heat-dissipating fins 37a. The heat generated in the second unidirectional conducting component packages 36 is transferred from the second heat-dissipating copper tabs 36b to the rear bracket 2 and is dissipated from the rear bracket 2. In addition, the heat generated in the voltage regulator 18 is transferred to the regulator heat sink 17 and dissipated by heat-dissipating fins of the regulator heat sink 17.

At the same time, at the front end, external air is sucked in axially through the front-end air intake apertures 1a due to the rotation of the centrifugal fans 5, and is then deflected centrifugally by the centrifugal fans 5, cooling a front-end coil end group 16f of the stator winding 16 before being expelled to the outside through the front-end air discharge apertures 1b.

In this conventional automotive alternator, as explained above, the voltage regulator 18 is mounted in the circuit housing portion 31 of the brush holder 11, the brush holder 11 is mounted to the rear bracket 2 using the brush holder mounting portion 33, and at the same time the rectifier 12 is mounted to the rear bracket 2 using the rectifier circuit board 39. Thus, in the conventional automotive alternator, because the voltage regulator 18 and the rectifier 12 each require their own separate supporting members, one problem has been that the number of parts is large, making assembly poor.

SUMMARY OF THE INVENTION

The present invention aims to solve the above problems and an object of the present invention is to provide an automotive alternator enabling improved assembly by mounting a rectifier and a voltage regulator on a bracket supported by a single supporting member to reduce the number of parts.

In order to achieve the above object, according to one aspect of the present invention, there is provided an automotive alternator including:

a shaft rotatably supported by a bracket;

a rotor fastened to the shaft, the rotor being disposed inside the bracket;

a stator fastened to the bracket so as to envelop an outer circumference of the rotor;

a rectifier for rectifying an alternating-current output of the stator, the rectifier being provided with a rectifier heat sink on which a plurality of semiconductor components is disposed and a rectifier circuit board for connecting the plurality of semiconductor components so as to constitute a bridge circuit;

a voltage regulator for adjusting an output voltage of the rectifier, the voltage regulator being provided with a voltage regulator circuit board on which a voltage regulating circuit is formed and a voltage regulator heat sink on which the voltage regulator circuit board is disposed; and a cooling means for cooling the rectifier and the voltage regulator, wherein the plurality of semiconductor components and the voltage regulator circuit board are supported by a single supporting member and mounted to the bracket.

The supporting member may be constructed by integrating the rectifier heat sink and the voltage regulator heat sink.

The rectifier heat sink and the voltage regulator heat sink may be integrated by interposing a linking member, the linking member being composed of a material having a coefficient of thermal conductivity less than coefficients of thermal conductivity of the rectifier heat sink and the voltage regulator heat sink.

The cooling means may be a centrifugal fan disposed inside the bracket, and the supporting member may be formed into an annular shape and mounted to the bracket so as to be perpendicular to an axis of the shaft, the plurality of semiconductor components and the voltage regulator circuit board being distributed in a circumferential direction around the shaft.

The cooling means may be constituted by a conduit disposed in the bracket and a coolant distributed through the conduit.

The semiconductor components may be constituted by MOSFETs.

The stator may include a cylindrical stator core in which slots extending axially are disposed at a predetermined pitch in a circumferential direction, and a stator winding formed by installing conductor wires, each conductor wire being folded over outside the slots at an end surface of the stator core so as to occupy different layers in a slot depth direction in the slots at predetermined slot intervals, wherein folded-over portions of the conductor wires constitute coil ends, and a coil end group of the stator winding is constituted by arranging the coil ends in neat rows in a circumferential direction.

DETAILED DESCRIPTION OF THE PREFERRED EMBODIMENTS

The preferred embodiments of the present invention will now be explained with reference to the drawings.

Embodiment 1

Figure 1:
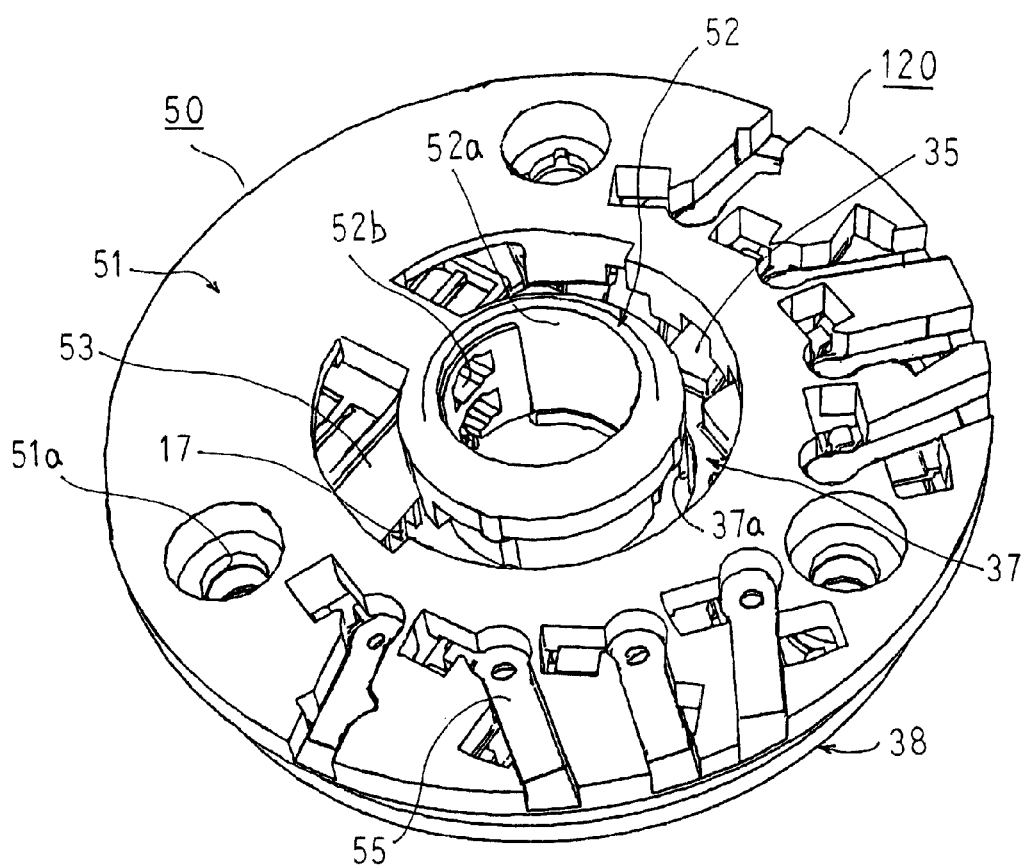
FIG. 1 is a front perspective of an assembled state of a rectifier and a voltage regulator used in an automotive alternator according to Embodiment 1 of the present invention.
Figure 2:
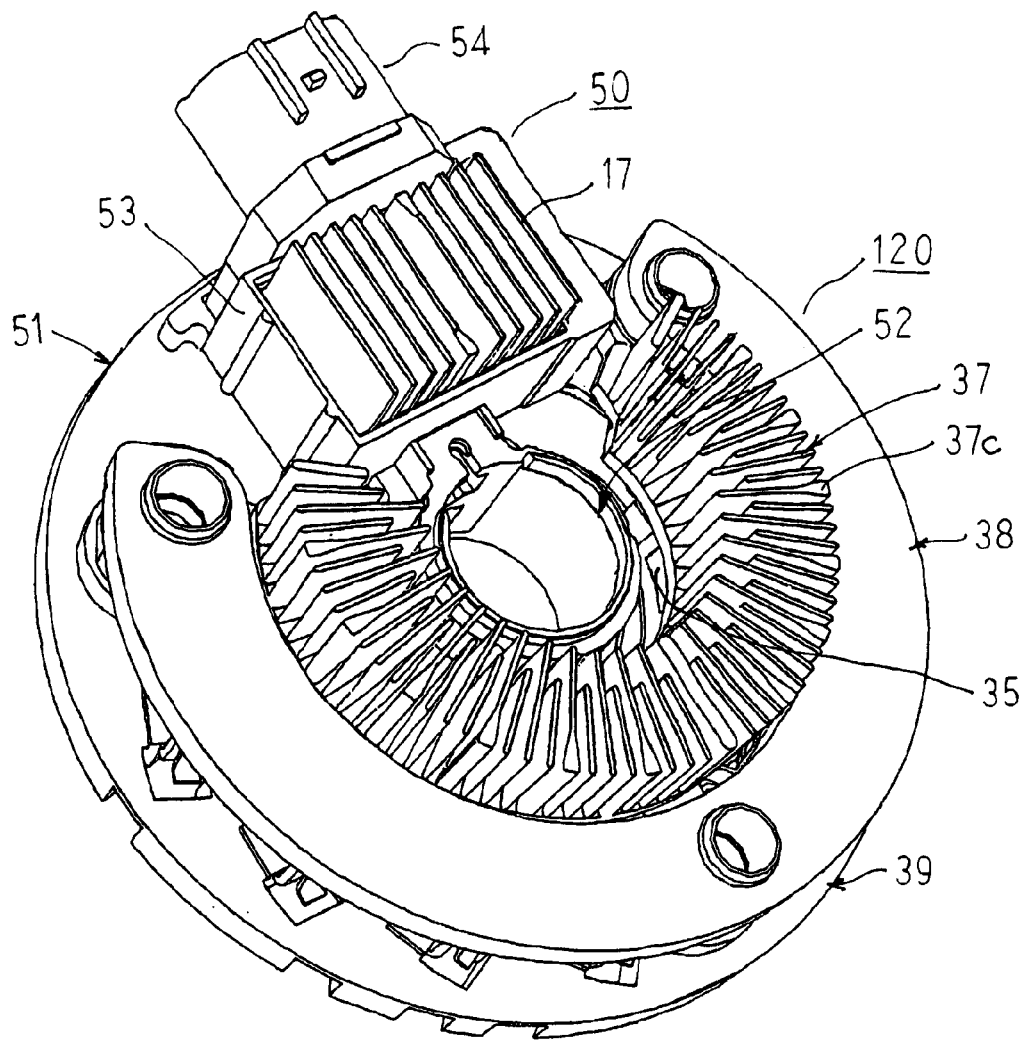
FIG. 2 is a rear perspective of the assembled state of the rectifier and the voltage regulator used in the automotive alternator according to Embodiment 1 of the present invention.
Figure 3:
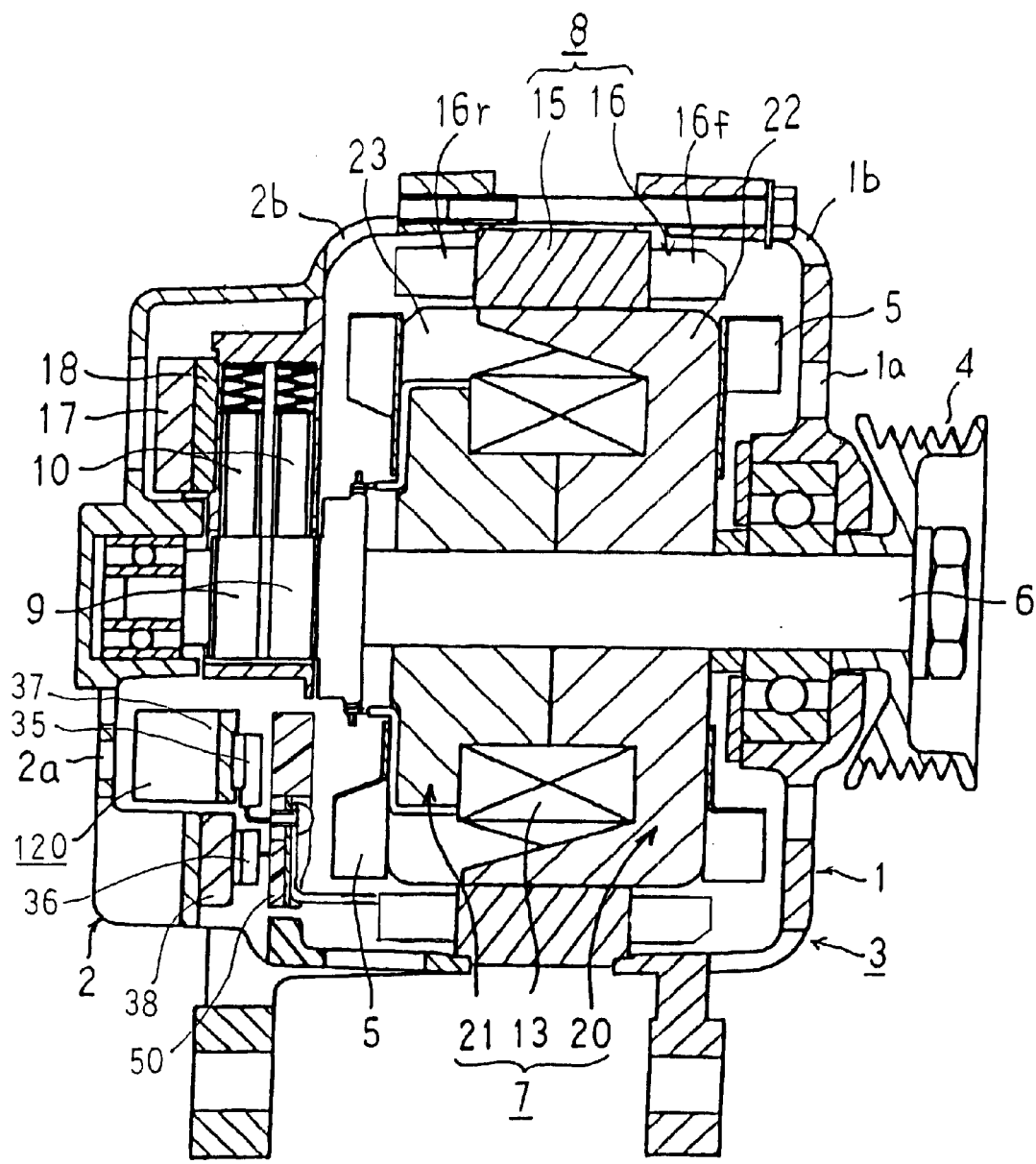
FIG. 3 is a cross section of the automotive alternator according to Embodiment 1 of the present invention.

FIG. 1 is a front perspective of an assembled state of a rectifier and a voltage regulator used in an automotive alternator according to Embodiment 1 of the present invention, FIG. 2 is a rear perspective of the assembled state of the rectifier and the voltage regulator used in the automotive alternator according to Embodiment 1 of the present invention, and FIG. 3 is a cross section of the automotive alternator according to Embodiment 1 of the present invention.

In each of the figures, a supporting member 50 is an annular molded resin body composed of a polyphenol resin or the like, having disposed integrally therein: an annular mounting portion 51; a shaft insertion portion 52 extending inwards from the annular mounting portion 51, the shaft insertion portion 52 having a shaft insertion aperture 52a into which a shaft 6 is inserted and brush insertion apertures 52b into which brushes 10 are inserted; a circuit housing portion 53; and a connector portion (not shown). This supporting member 50 has a function as a rectifier circuit board for a rectifier 120, and an insert conductor group is insert molded into the supporting member 50, constituting wiring for component parts, also constituting connection terminals extending out into the connector portion, and further constituting connection terminals 55, etc., functioning as electrical joint portions for first and second diode connection terminals 35c and 36c of first and second unidirectional conducting component packages 35 and 36, respectively. In addition, mounting apertures 51a are disposed at three positions on the mounting portion 51. Moreover, a voltage regulator 18 and the rectifier 120 are electrically connected by the insert conductors insert molded into the supporting member 50. One of the mounting apertures 51a is used as an output terminal for the rectifier 120.

The voltage regulator 18 is mounted in the supporting member 50 by housing a voltage regulator circuit board (not shown) in the circuit housing portion 53, the voltage regulator circuit board being mounted with electronic components such as IC chips constituting a voltage regulator circuit, fitting a regulator heat sink 17 into the circuit housing portion 53, and sealing edge portions of the regulator heat sink 17 to the circuit housing portion 53. The rectifier 120 is constructed by disposing first and second rectifier heat sinks 37 and 38 coaxially such that main surfaces thereof are positioned in a common plane on the mounting portion 51 of the supporting member 50, the first and second unidirectional conducting component packages 35 and 36 being disposed on the first and second rectifier heat sinks 37 and 38, and joining the first and second diode connection terminals 35c and 36c of the first and second unidirectional conducting component packages 35 and 36 to the connection terminals 55.

The supporting member 50 constructed in this manner is secured to a rear bracket 2 by mounting screws (not shown) that pass through the mounting apertures 51a. The brushes 10 are inserted into the brush insertion apertures 52b and the shaft 6 is inserted into the shaft insertion aperture 52a to assemble the automotive alternator shown in FIG. 3. Moreover, the rest of the construction is constructed in a similar manner to the conventional automotive alternator.

According to Embodiment 1, because the rectifier 120 and the voltage regulator 18 are supported by the single supporting member 50 and mounted to the rear bracket 2, the number of parts is reduced, improving assembly.

Because the insert conductors are insert molded into the supporting member 50, the rectifier circuit board 39 required conventionally is no longer required. In addition, because the rectifier 120 and the voltage regulator 18 are electrically connected by the insert conductors, the rectifier connection terminals 34 and the second rectifier circuit board connection terminals 39c required conventionally are no longer required, improving assembly.

Because the annular mounting portion 51 is disposed so as to be perpendicular to an axis of the shaft 6 and the first and second unidirectional conducting component packages 35 and 36 and the voltage regulator 18 are distributed in a circumferential direction, air sucked in through an air intake aperture 2a by a centrifugal fan 5 functioning as a cooling means is efficiently provided to cool the first and second unidirectional conducting component packages 35 and 36 and the voltage regulator 18, improving cooling.

In the conventional automotive alternator, because the brush holder 11 and the rectifier 12 are supported by separate supporting members, there are gaps between circumferential end portions of the brush holder 11 and the rectifier 12, and a portion of the air sucked in through the air intake aperture 2a flows through the above gaps and forms an axial flow directed towards a rotor 7. Thus, when the air sucked in through the air intake aperture 2a passes the brush holder 11 and the rectifier 12, ventilation resistance becomes unbalanced in a circumferential direction, making it difficult to smooth the cooling air flow and increasing wind noise. In Embodiment 1, because the supporting member 50, which supports the first and second unidirectional conducting component packages 35 and 36 (the rectifier) and the voltage regulator 18, is constructed into an annular body, the air sucked in through the air intake aperture 2a flows radially inward, becomes an axial flow from an inner circumferential edge of the supporting member 50, and flows towards the rotor 7, smoothing the cooling air flow and reducing wind noise.

Embodiment 2

Figure 4:
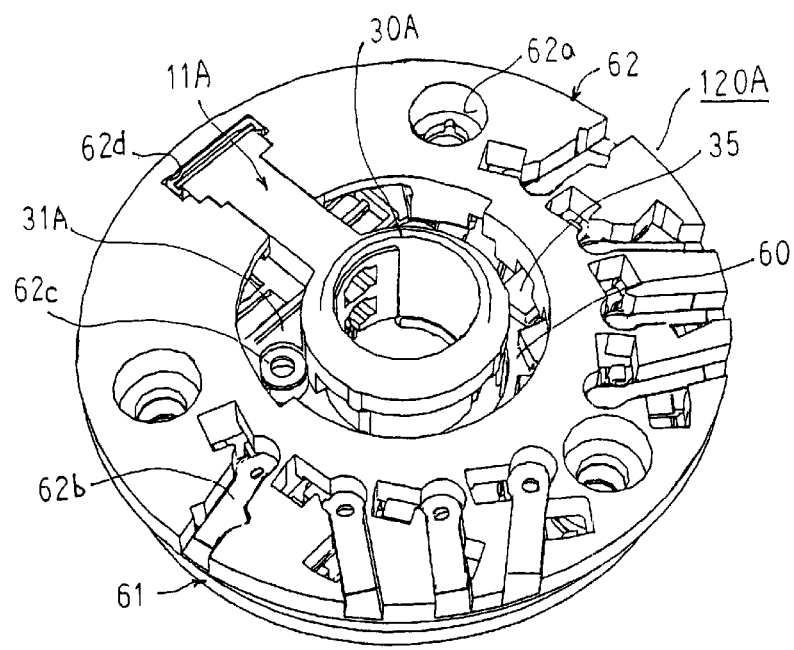
FIG. 4 is a front perspective of an assembled state of a rectifier and a voltage regulator used in an automotive alternator according to Embodiment 2 of the present invention.
Figure 5:
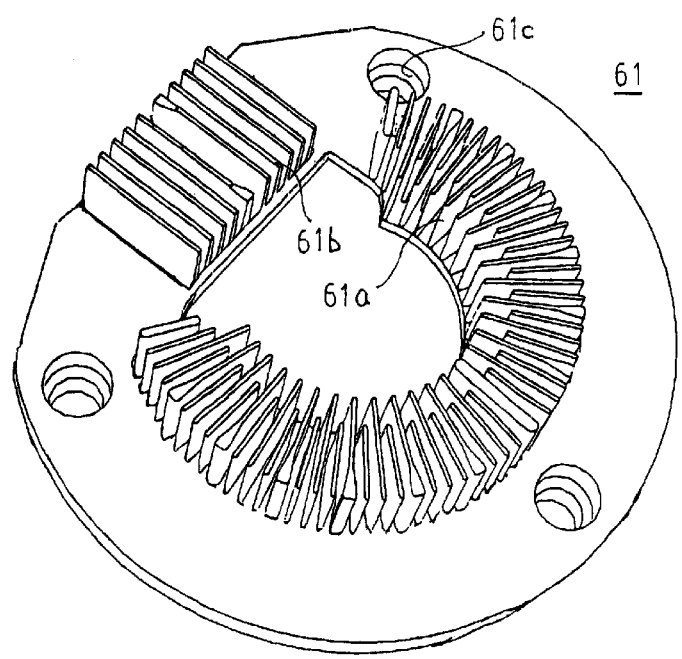
FIG. 5 is a rear perspective of a second heat sink of the rectifier used in the automotive alternator according to Embodiment 2 of the present invention.
Figure 7:
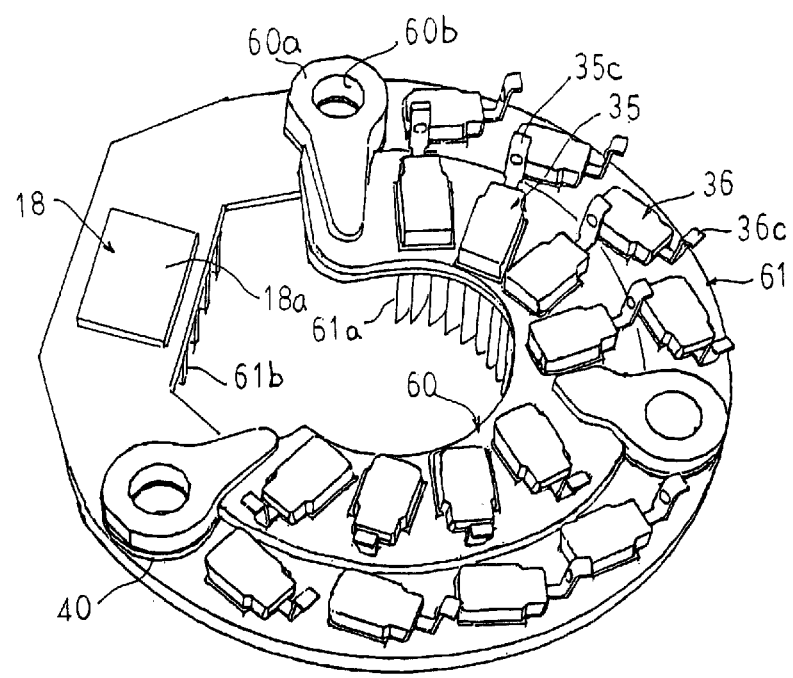
FIG. 7 is a front perspective of a disposition of first and second unidirectional conducting component packages and a voltage regulator circuit board used in the automotive alternator according to Embodiment 2 of the present invention.
Figure 6:
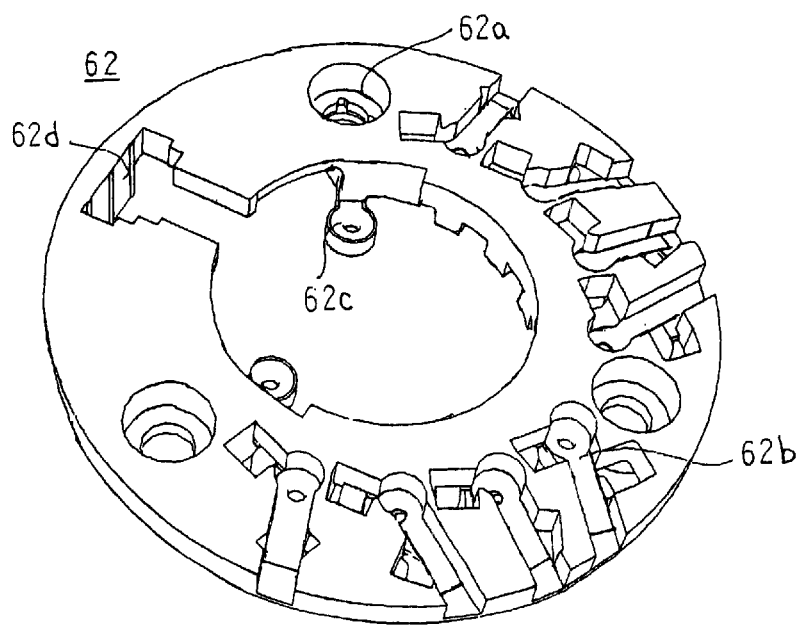
FIG. 6 is a front perspective of a rectifier circuit board of the rectifier in the automotive alternator according to Embodiment 2 of the present invention.
Figure 8:
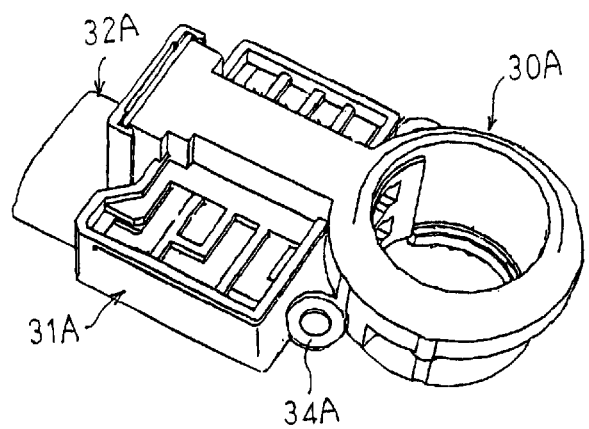
FIG. 8 is a front perspective of a brush holder used in the automotive alternator according to Embodiment 2 of the present invention.

FIG. 4 is a front perspective of an assembled state of a rectifier and a voltage regulator used in an automotive alternator according to Embodiment 2 of the present invention, FIG. 5 is a rear perspective of a second heat sink of the rectifier used in the automotive alternator according to Embodiment 2 of the present invention, FIG. 6 is a front perspective of a rectifier circuit board of the rectifier in the automotive alternator according to Embodiment 2 of the present invention, FIG. 7 is a front perspective of a disposition of first and second unidirectional conducting component packages and a voltage regulator circuit board used in the automotive alternator according to Embodiment 2 of the present invention, and FIG. 8 is a front perspective of a brush holder used in the automotive alternator according to Embodiment 2 of the present invention.

In each of the figures, a second heat sink 61 functioning as a supporting member is an annular molded aluminum body, first and second heat-dissipating fins 61a and 61b being disposed on a back surface thereof, and three heat sink penetrating apertures 61c being disposed so as to pierce therethrough. A first heat sink 60 is a horseshoe-shaped molded aluminum body, flange portions 60a being disposed so as to extend radially outwards from first and second circumferential end portions and from a central portion thereof, and flange penetrating apertures 60b being disposed so as to pierce through each of the flange portions 60a. A rectifier circuit board 62 is an annular molded resin body composed of a polyphenol resin or the like, three mounting apertures 62a being disposed so as to pierce therethrough, and in addition, a notch 62d for brush holder insertion being disposed therein. A first insert conductor group is insert molded into the rectifier circuit board 62, constituting wiring for component parts, also constituting first rectifier circuit board connection terminals 62b functioning as electrical joint portions for first and second diode connection terminals 35c and 36c of the first and second unidirectional conducting component packages 35 and 36, respectively, and further constituting second rectifier circuit board connection terminals 62c, etc., functioning as electrical joint portions for the voltage regulator 18 and a rectifier 120A.

A brush holder 11A is a molded resin body composed of a polyphenol resin or the like in which a shaft insertion portion 30A, a circuit housing portion 31A, and a connector portion 32A are formed integrally. A second insert conductor group is insert molded into the brush holder 11A, constituting wiring for component parts, also constituting connection terminals protruding out into the connector portion 32A, and further constituting rectifier connection terminals 34A, etc., functioning as electrical joint portions for the rectifier 120A.

Eight first unidirectional conducting component packages 35 are disposed in a circumferential direction on a main surface of the first heat sink 60, and eight second unidirectional conducting component packages 36 are disposed in a circumferential direction on a main surface of the second heat sink 61. The first heat sink 60 is disposed on the main surface of the second heat sink 61. Here, electrically-insulating bushes 40 are interposed between the flange portions 60a and the main surface of the second heat sink 61, and a heat-resistant electrically-insulating sheet (not shown) is interposed between a back surface of the first heat sink 60 and the main surface of the second heat sink 61, ensuring electrical insulation between the first and second heat sinks 60 and 61. Aperture positions of the flange penetrating apertures 60b and the heat sink penetrating apertures 61c are aligned. In addition, the first heat sink 60 is disposed on the main surface of the second heat sink 61 so as to be opposite the region in which the first heat dissipating fins 61a are disposed.

A voltage regulator circuit board 18a of the voltage regulator 18 forming a voltage regulator circuit mounted with electronic components such as IC chips is secured by adhesive to the main surface of the second heat sink 61 so as to be opposite the region in which the second heat dissipating fins 61b are disposed. The brush holder 11A is disposed on the main surface of the second heat sink 61 so as to house the voltage regulator circuit board 18a in the circuit housing portion 31A, and is mounted to the second heat sink 61 by a seal member. In addition, the rectifier circuit board 62 is mounted to the first and second heat sinks 60 and 61 so as to house a portion of the brush holder 11A in the notch 62d, the first and second diode connection terminals 35c and 36c of the first and second unidirectional conducting component packages 35 and 36 are connected to the first rectifier circuit board connection terminals 62b, and in addition the rectifier connection terminals 34A of the brush holder 11A are connected to the second rectifier circuit board connection terminals 62c. Here, aperture positions of the mounting apertures 62a are aligned with the flange penetrating apertures 60b and the heat sink penetrating apertures 61c.

Thus, the second heat sink 61, which supports the first and second unidirectional conducting component packages 35 and 36 and the voltage regulator circuit board 18a, is secured to the rear bracket 2 by mounting screws (not shown) that pass through the mounting apertures 62a, the flange penetrating apertures 60b, and the heat sink penetrating apertures 61c. By fastening these mounting screws, the brush holder 11A is held firmly between the rectifier circuit board 62 and the second heat sink 61. Moreover, the rest of the construction is constructed in a similar manner to Embodiment 1 above.

In Embodiment 2, because the rectifier 120A and the voltage regulator 18 are supported by the second heat sink 61, which is a single supporting member, and are mounted to the rear bracket 2, the number of parts is also reduced, improving assembly.

Because the annular second heat sink 61 is disposed so as to be perpendicular to the axis of the shaft 6, and the first and second unidirectional conducting component packages 35 and 36 and the voltage regulator circuit board 18a (the voltage regulator 18) are distributed in a circumferential direction, air sucked in through the air intake aperture 2a by the centrifugal fan 5 functioning as a cooling means is efficiently provided to cool the first and second unidirectional conducting component packages 35 and 36 and the voltage regulator 18, improving cooling.

In addition, because the second heat sink 61, which supports the first and second unidirectional conducting component packages 35 and 36 (the rectifier) and the voltage regulator circuit board 18a (the voltage regulator 18), is constructed into an annular body, the air sucked in through the air intake aperture 2a flows radially inward, becomes an axial flow from an inner circumferential edge of the second heat sink 61, and flows towards the rotor 7, smoothing the cooling air flow and reducing wind noise.

In Embodiment 2, because the second heat sink 61 for the rectifier also functions as a heat sink for the voltage regulator, compared to Embodiment 1, the regulator heat sink 17 is no longer required and the heat-conducting surface area of the heat sinks is enlarged, improving cooling of the first and second unidirectional conducting component packages 35 and 36 and the voltage regulator circuit board 18a.

Embodiment 3

Figure 9:
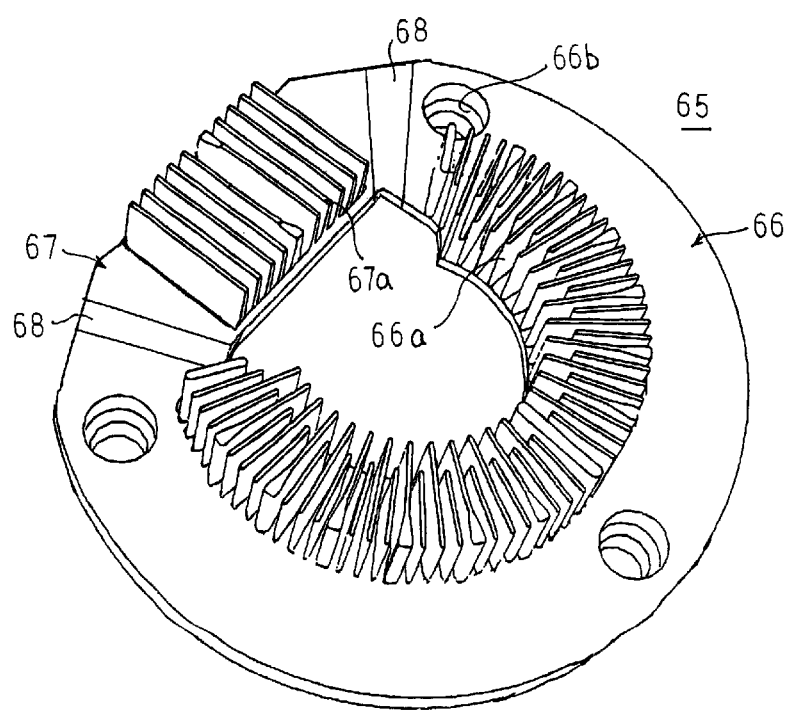
FIG. 9 is a rear perspective of a second rectifier heat sink of a rectifier used in an automotive alternator according to Embodiment 3 of the present invention.

As shown in FIG. 9, in Embodiment 3, a supporting member 65 is constituted by a second rectifier heat sink 66 for the rectifier, a regulator heat sink 67 for the voltage regulator, and linking members 68 linking the second rectifier heat sink 66 and the regulator heat sink 67. The second rectifier heat sink 66 is a horseshoe-shaped molded aluminum body, rectifier heat-dissipating fins 66a being disposed on a back surface thereof, and heat sink penetrating apertures 66b being disposed so as to pierce through circumferential end portions and a central portion thereof. The regulator heat sink 67 is a molded aluminum body, regulator heat-dissipating fins 67a being disposed on a back surface thereof. The linking members 68 are made of a resin such as a polyphenol resin or the like and integrate the second rectifier heat sink 66 and the regulator heat sink 67. In a similar manner to Embodiment 2 above, the second unidirectional conducting component packages 36 are disposed on a main surface of the second rectifier heat sink 66, and the first heat sink 60, which has the first unidirectional conducting component packages 35 disposed thereon, is also disposed on the main surface of the second rectifier heat sink 66. The voltage regulator circuit board 18a is secured by adhesive to a main surface of the regulator heat sink 67.

Moreover, the rest of the construction is constructed in a similar manner to Embodiment 2 above.

In Embodiment 3, because the rectifier and the voltage regulator are supported by the single supporting member 65 and mounted to the rear bracket 2, the number of parts is also reduced, improving assembly.

Because the supporting member 65 forms an annular shape and is disposed so as to be perpendicular to the axis of the shaft 6, and the first and second unidirectional conducting component packages 35 and 36 and the voltage regulator are distributed in a circumferential direction, air sucked in through the air intake aperture 2a by the centrifugal fan 5 functioning as a cooling means is efficiently provided to cool the first and second unidirectional conducting component packages 35 and 36 and the voltage regulator, improving cooling.

In addition, because the supporting member 65 which supports the first and second unidirectional conducting component packages 35 and 36 (the rectifier) and the voltage regulator circuit board 18a (the voltage regulator) is constructed into an annular body, the air sucked in through the air intake aperture 2a flows radially inward, becomes an axial flow from an inner circumferential edge of the second rectifier heat sink 66, and flows towards the rotor 7, smoothing the cooling air flow and reducing wind noise.

According to Embodiment 3, the second rectifier heat sink 66 for the rectifier and the regulator heat sink 67 for the regulator are integrated by the interposition of the linking members 68. Because the second rectifier heat sink 66 and the regulator heat sink 67 are made of aluminum and the linking members 68 are made of a resin such as a polyphenol resin or the like, the coefficient of thermal conductivity of the linking members 68 is extremely small compared to the coefficients of thermal conductivity of the second rectifier heat sink 66 and the regulator heat sink 67. Thus, heat generated in the first and second unidirectional conducting component packages 35 and 36 is less likely to be conducted to the voltage regulator circuit board 18a, suppressing temperature increases in the regulator circuit board 18a resulting from heat generated in the first and second unidirectional conducting component packages 35 and 36.

Now, in Embodiment 3 above, the second rectifier heat sink 66 and the regulator heat sink 67 are simply linked by the linking members 68, but the second rectifier heat sink 66 and the regulator heat sink 67 may be molded into a polyphenol resin or the like while ensuring that essential surfaces thereof are exposed. In that case, the strength of an integrated body formed from the second rectifier heat sink 66 and the regulator heat sink 67 is sufficiently ensured, enabling superior reliability to be achieved.

Embodiment 4

Figure 29:
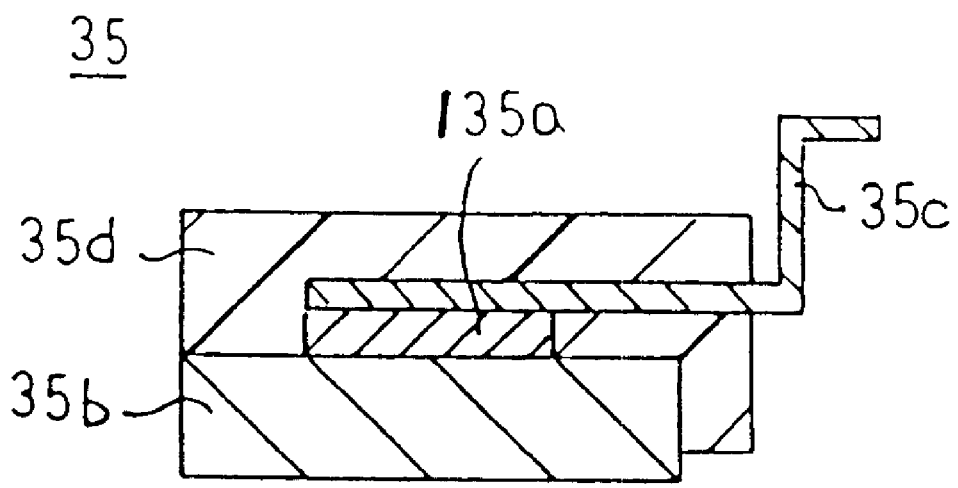
FIG. 29 is a cross section of a first unidirectional conducting component package, including MOSFET, used in the rectifier of the automotive alternator.
Figure 30:
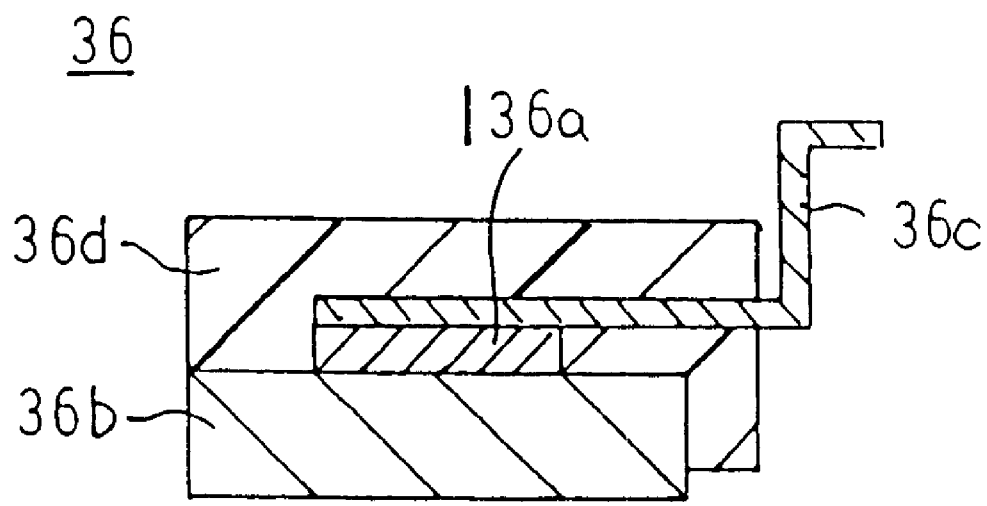
FIG. 30 is a cross section of a second unidirectional conducting component package, including MOSFET, used in the rectifier of the automotive alternator.

In Embodiments 1 to 3 above, a bridge circuit is constituted by first and second diodes 35a and 36a, but in Embodiment 4, a bridge circuit is constituted by silicon-based Si-MOSFETs 135a and 136a functioning as semiconductor components, as is shown in FIGS. 29 and 30.

According to Embodiment 4, because Si-MOSFETs can lower resistance loss such as rectification loss, heat generated in the bridge circuit constituted by the Si-MOSFETs is suppressed, enabling a temperature difference between the rectifier and the voltage regulator to be reduced. Thus, the temperatures of the rectifier and the voltage regulator are made uniform, improving the cooling efficiency of the cooling air flow formed by the centrifugal fan 5. Moreover, even if the Si-MOSFETs and the voltage regulator circuit board 18a are supported by a single heat sink as shown in Embodiment 2 above, the heat generated by one will not adversely affect the other.

Embodiment 5

Figure 10:
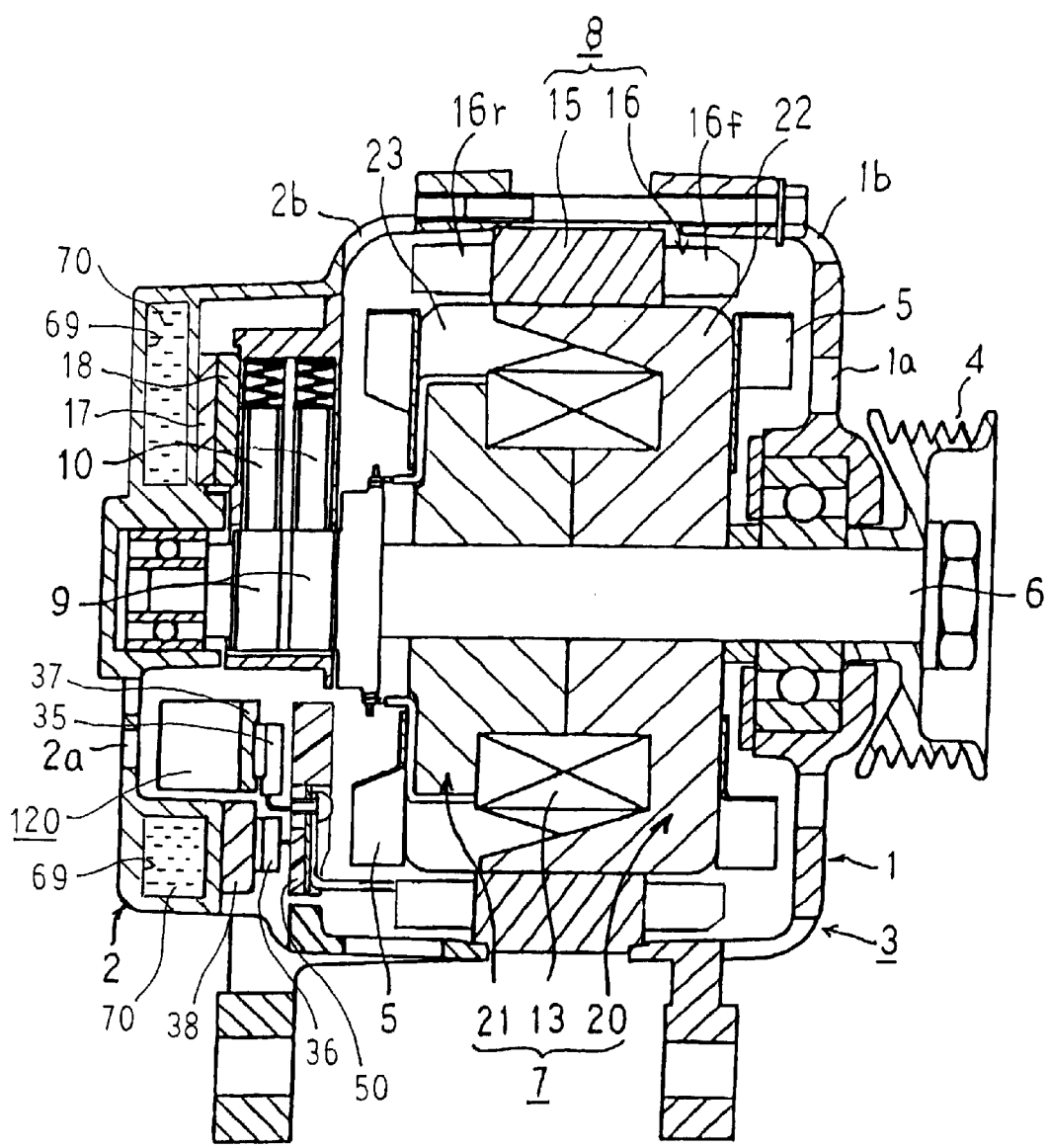
FIG. 10 is a cross section of an automotive alternator according to Embodiment 5 of the present invention.

In Embodiment 5, as shown in FIG. 10, a conduit 69 is formed in a rear bracket 2A, and cooling water 70 functioning as a coolant is distributed through the conduit 69. Heat-dissipating fins are omitted from the regulator heat sink 17, and the regulator heat sink 17 is placed in close contact with an inner wall surface of the rear bracket 2A. Here, the conduit 69 and the cooling water 70 distributed through the conduit 69 constitute a cooling means. Moreover, the rest of the construction is constructed in a similar manner to Embodiment 1 above.

In Embodiment 5, heat generated in the first unidirectional conducting component packages 35 is absorbed by air which is sucked in through the air intake aperture 2a by the centrifugal fan 5 and flows along heat-dissipating fins of the first rectifier heat sink 37. Heat generated in the second unidirectional conducting component packages 36 is transferred through the second rectifier heat sink 38 to the rear bracket 2A and is absorbed by the cooling water 70 flowing through the inside of the conduit 69. In addition, heat generated in the voltage regulator 18 is transferred through the regulator heat sink 17 to the rear bracket 2A and is absorbed by the cooling water 70 distributed through the conduit 69.

Consequently, according to Embodiment 5, in addition to the effects of Embodiment 1 above, temperature increase in the rectifier 120 and the voltage regulator 18 can be reliably suppressed.

Embodiment 6

Figure 11:
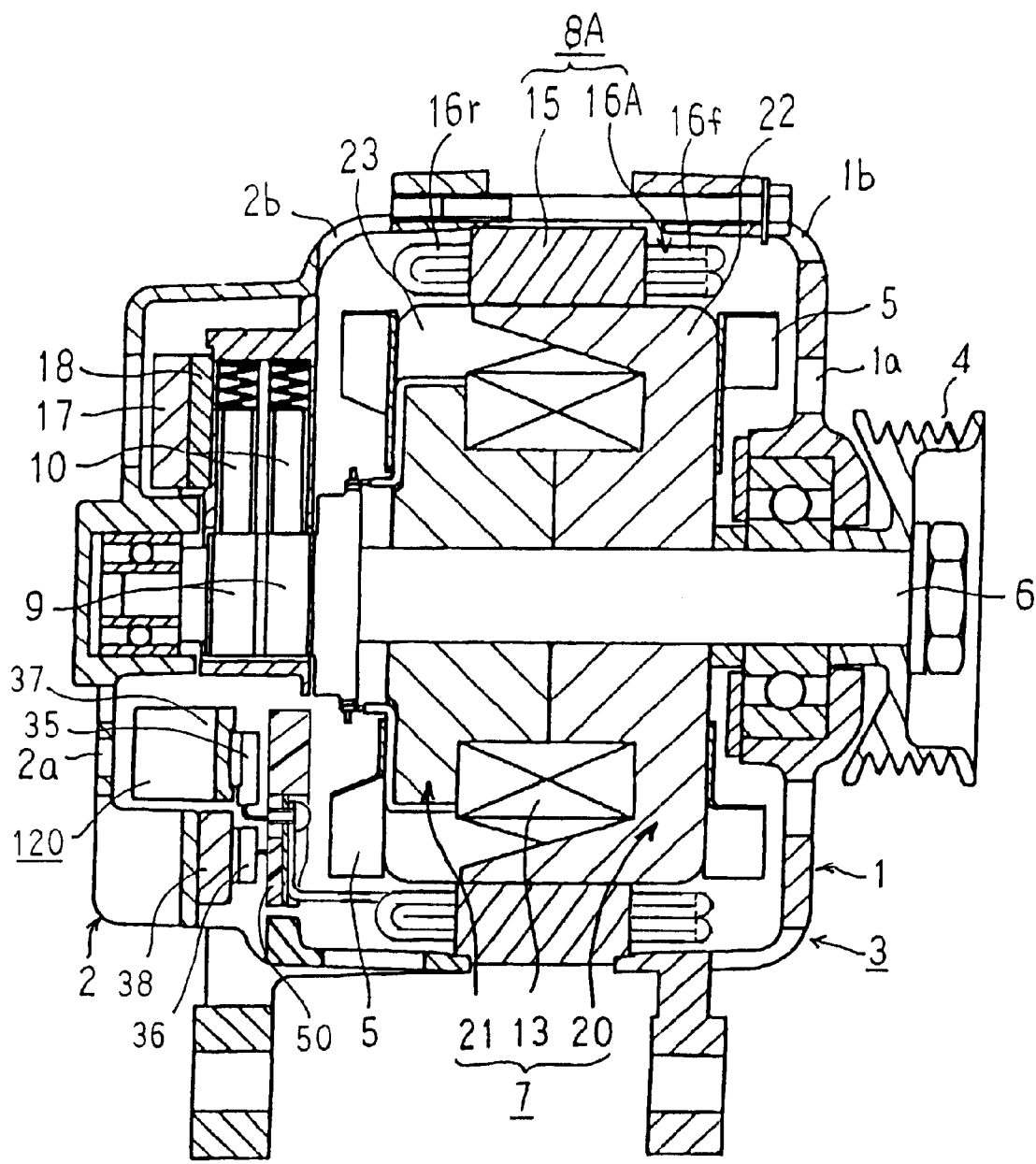
FIG. 11 is a cross section of an automotive alternator according to Embodiment 6 of the present invention.

Embodiment 6 is constructed in a similar manner to Embodiment 1 above except for the fact that a stator 8A is used in place of the stator 8, as shown in FIG. 11.

Figure 12:
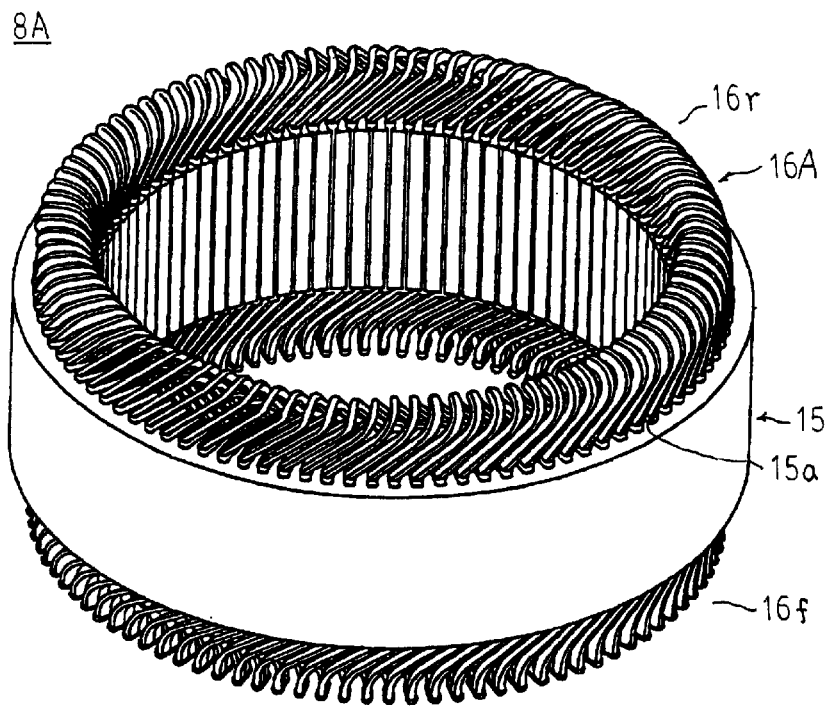
FIG. 12 is a perspective of a stator in the automotive alternator according to Embodiment 6 of the present invention.
Figure 13:
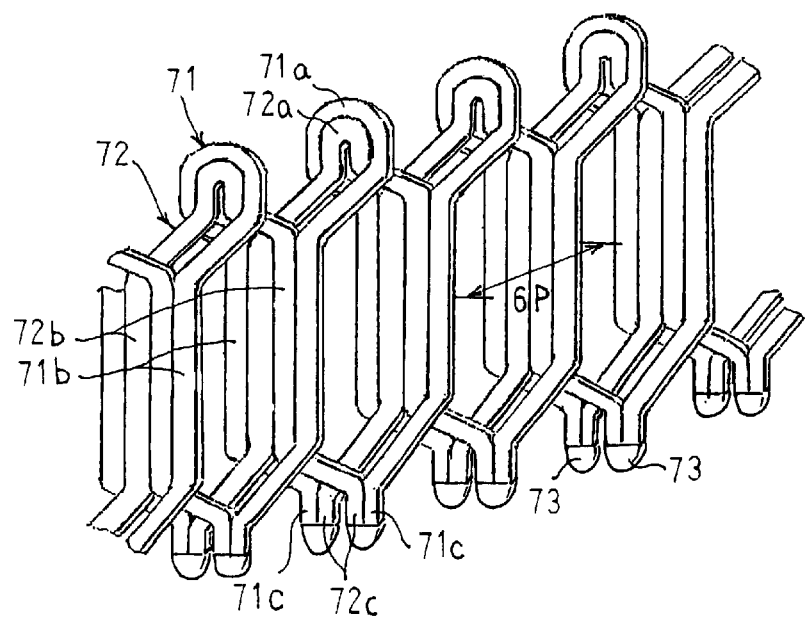
FIG. 13 is a diagram explaining a stator winding construction of the stator in the automotive alternator according to Embodiment 6 of the present invention.

The construction of the stator 8A will be explained here with reference to FIGS. 12 and 13. Moreover, FIG. 13 shows a part of one stator winding phase portion.

The stator 8A is constituted by a cylindrical stator core 15 in which slots 15a extending axially are disposed at a predetermined pitch in a circumferential direction, and a stator winding 16A formed by installing conductor wires so as to fold over outside the slots at an end surface of the stator core 15 and alternately occupy different layers in a slot depth direction in every sixth slot 15a.

Large conductor segments 71 and small conductor segments 72 are used for the conductor wires constituting this stator winding 16A, the large and small conductor segments 71 and 72 being formed by folding and bending short lengths of copper wire coated with electrical insulation into general U shapes. The large conductor segments 71 are formed into a general U shape in which a pair of large-segment slot-housed portions 71b is linked by a large turn portion 71a. Similarly, the small conductor segments 72 are formed into a general U shape in which a pair of small-segment slot-housed portions 72b is linked by a small turn portion 72a. Furthermore, ninety-six slots 15a are disposed in the stator core 15.

First, the small conductor segments 72 are inserted from a rear end of the stator core 15 into a third position from an inner circumferential side in a slot depth direction (hereinafter called "a third address") and into a second position from the inner circumferential side in the slot depth direction (hereinafter called "a second address"), respectively, in pairs of slots 15a in which the slots in each pair are six slots apart, and the large conductor segments 71 are inserted from the rear end of the stator core 15 into a first position from the inner circumferential side in the slot depth direction (hereinafter called "a first address") and into a fourth position from the inner circumferential side in the slot depth direction (hereinafter called "a fourth address"), respectively, in pairs of slots 15a in which the slots in each pair are six slots apart. Thus, two large-segment slot-housed portions 71b and two small-segment slot-housed portions 72b are housed in each of the slots 15a so as to line up in one row in a radial direction (the slot depth direction).

Next, free end portion sides of the large conductor segments 71 and the small conductor segments 72 extending outwards at a front end of the stator core 15 are bent into a splayed shape. Then, at the front end of the stator core 15, small-segment free end portions 72c of the small conductor segments 72 extending outwards from the second address of first slots 15a are stacked radially with large-segment free end portions 71c of the large conductor segments 71 extending outwards from the first address of second slots 15a six slots away, and joined by arc welding or the like. Similarly, at the front end of the stator core 15, large-segment free end portions 71c of the large conductor segments 71 extending outwards from the fourth address of the first slots 15a are stacked radially with small-segment free end portions 72c of the small conductor segments 72 extending outwards from the third address of the second slots 15a six slots away, and joined by arc welding or the like.

Thus, the large conductor segments 71 and the small conductor segments 72 inserted into a common slot group constituted by slots 15a lined up at a pitch of six slots (6P) are joined to form four winding sub-portions per slot group, each winding sub-portion having one turn. Then, the four winding sub-portions inserted into each slot group are connected in series to construct one stator winding phase portion having four turns. In other words, because there are six slot groups constituted by every sixth slot 15a, six stator winding phase portions are constructed. Next, two three-phase alternating-current windings are constructed by connecting three stator winding phase portions into each of two alternating-current connections. Thus, the stator 8A is obtained, in which the stator winding 16A constituted by the two three-phase alternating-current windings is installed in the stator core 15.

Thus, in the stator winding 16A constructed in this manner, the turn portions 71a and 72a (coil ends) of the large conductor segments 71 and the small conductor segments 72 which are formed by being folded over outside the slots at the rear end of the stator core 15 are arranged in neat rows in a circumferential direction so as to form two layers in an axial direction, constituting a rear-end coil end group 16r. Furthermore, joint portions 73 (coil ends) joining the free end portions 71c of the large conductor segments 71 and the free end portions 72c of the small conductor segments 72 at the front end of the stator core 15 are arranged in neat rows in a circumferential direction to form two rows in a radial direction, constituting a front-end coil end group 16f. Here, because the free end portions 71c of the large conductor segments 71 and the free end portions 72c of the small conductor segments 72 are stacked radially and joined, the joint portions 73 are formed into a folded-over shape outside the slots.

In Embodiment 6, the large turn portions 71a, which function as coil ends, each extend outwards at the rear end from the first address of the slots 15a, are folded over outside the slots, and enter the fourth address of the next slot 15a six slots away. In other words, the large turn portions 71a are each formed into a generally equal shape. Similarly, the small turn portions 72a, which function as coil ends, each extend outwards at the rear end from the third address of the slots 15a, are folded over outside the slots, and enter the second address of the next slot 15a six slots away. In other words, the small turn portions 72a are each formed into a generally equal shape. Thus, in the rear-end coil end group 16r, because the turn portions 71a and 72a are arranged in neat rows in a circumferential direction to form two layers in an axial direction, the rear-end coil end group 16r constitutes a heat-dissipating portion which is generally even relative to a circumferential direction.

On the other hand, in the coil end groups of the stator winding 16 of the stator 8, the coil ends are not disposed regularly in a circumferential direction and do not constitute a heat-dissipating portion which is generally even relative to a circumferential direction. As a result, the amount of heat dissipated from the coil end groups is not uniform relative to the circumferential direction, and there is a risk that portions of the rectifier and the voltage regulator disposed on an inner circumferential side of the coil end groups may be heated excessively, leading to deterioration of the cooling of the rectifier and the voltage regulator by the centrifugal fan 5.

In Embodiment 6, because the heat generated in the stator 8A is dissipated from the rear-end coil end group 16r uniformly relative to the circumferential direction, the influence of heat radiation on the rectifier 120 and the voltage regulator 18, which are disposed on an inner circumferential side of the rear-end coil end group 16r, is reduced.

Moreover, because a heat-dissipating portion which is generally even relative to a circumferential direction is also similarly constructed in the front-end coil end group 16f, similar effects can also be achieved in cases where the rectifier 120 and the voltage regulator are disposed at the front end.

Embodiment 7

Figure 14:
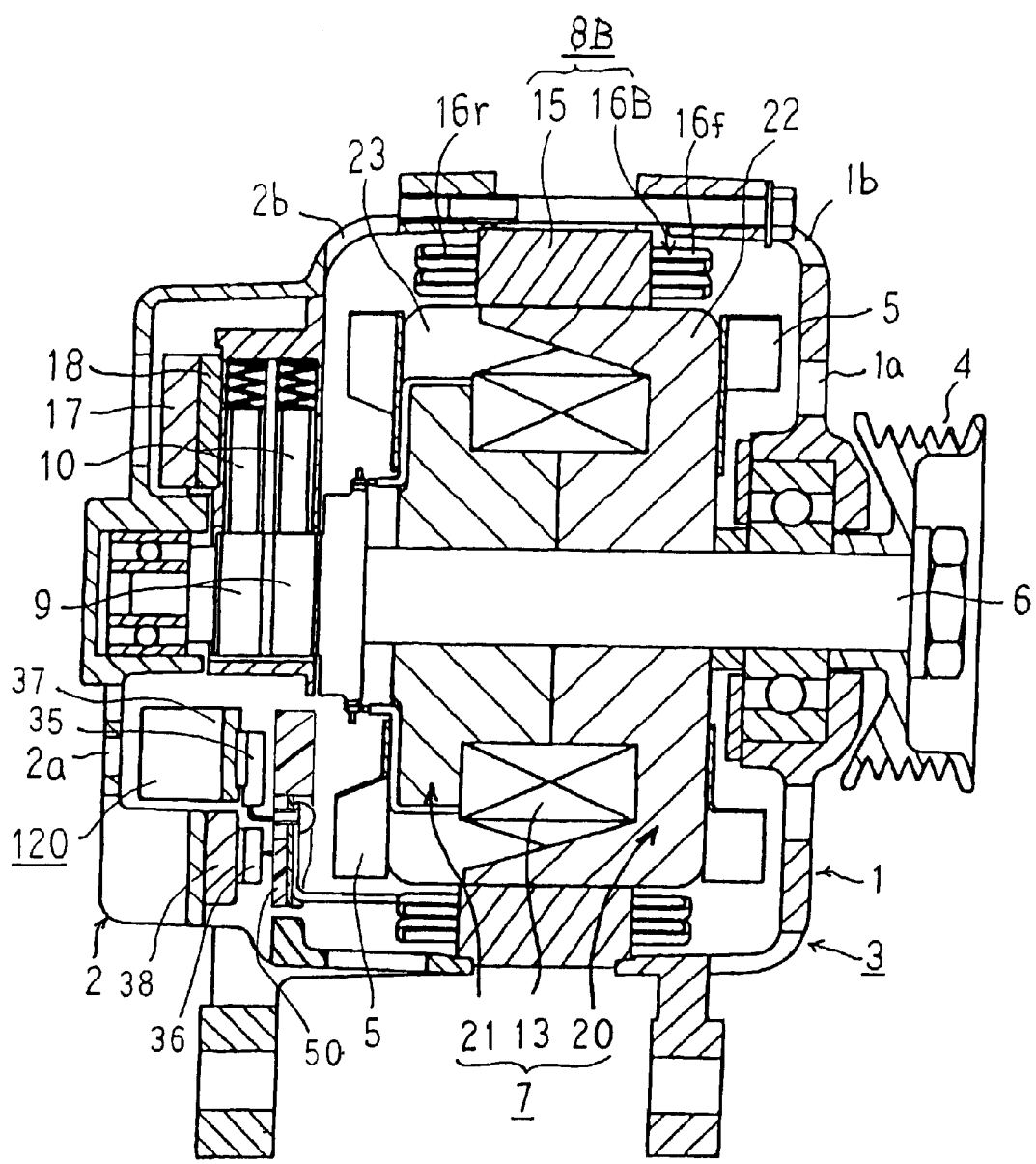
FIG. 14 is a cross section of an automotive alternator according to Embodiment 7 of the present invention.

Embodiment 7 is constructed in a similar manner to Embodiment 1 above except for the fact that a stator 8B is used in place of the stator 8, as shown in FIG. 14.

Figure 15:
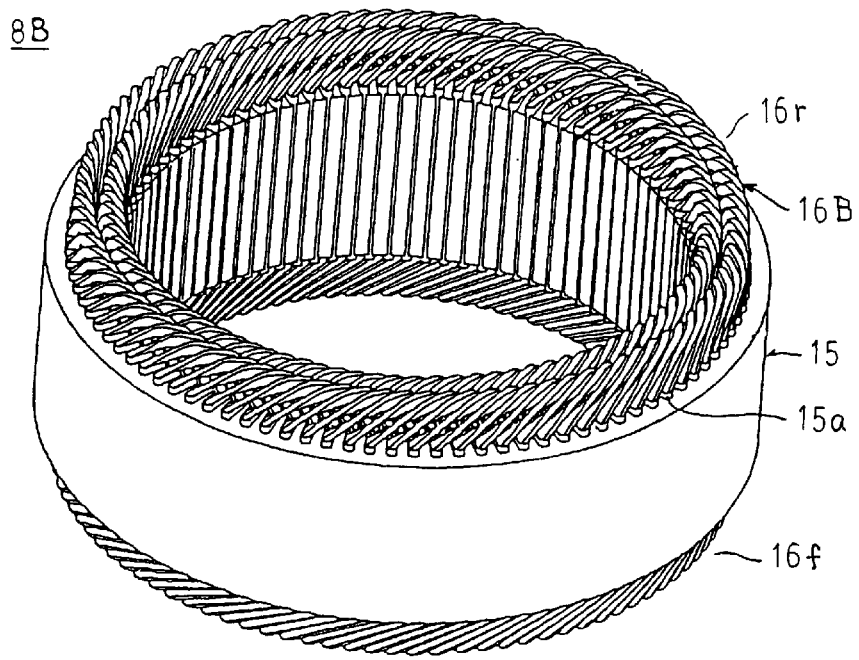
FIG. 15 is a perspective of a stator in the automotive alternator according to Embodiment 7 of the present invention.
Figure 16:
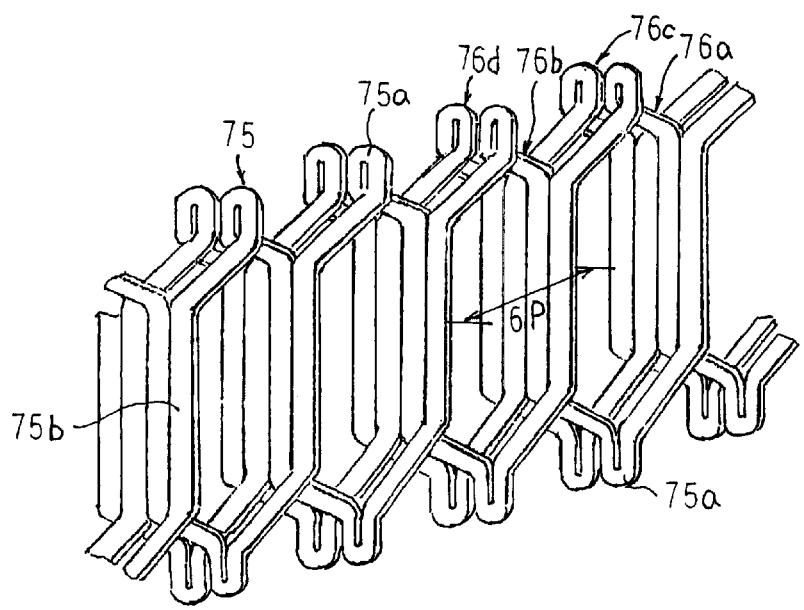
FIG. 16 is a diagram explaining a stator winding construction of the stator in the automotive alternator according to Embodiment 7 of the present invention.
Figure 17:
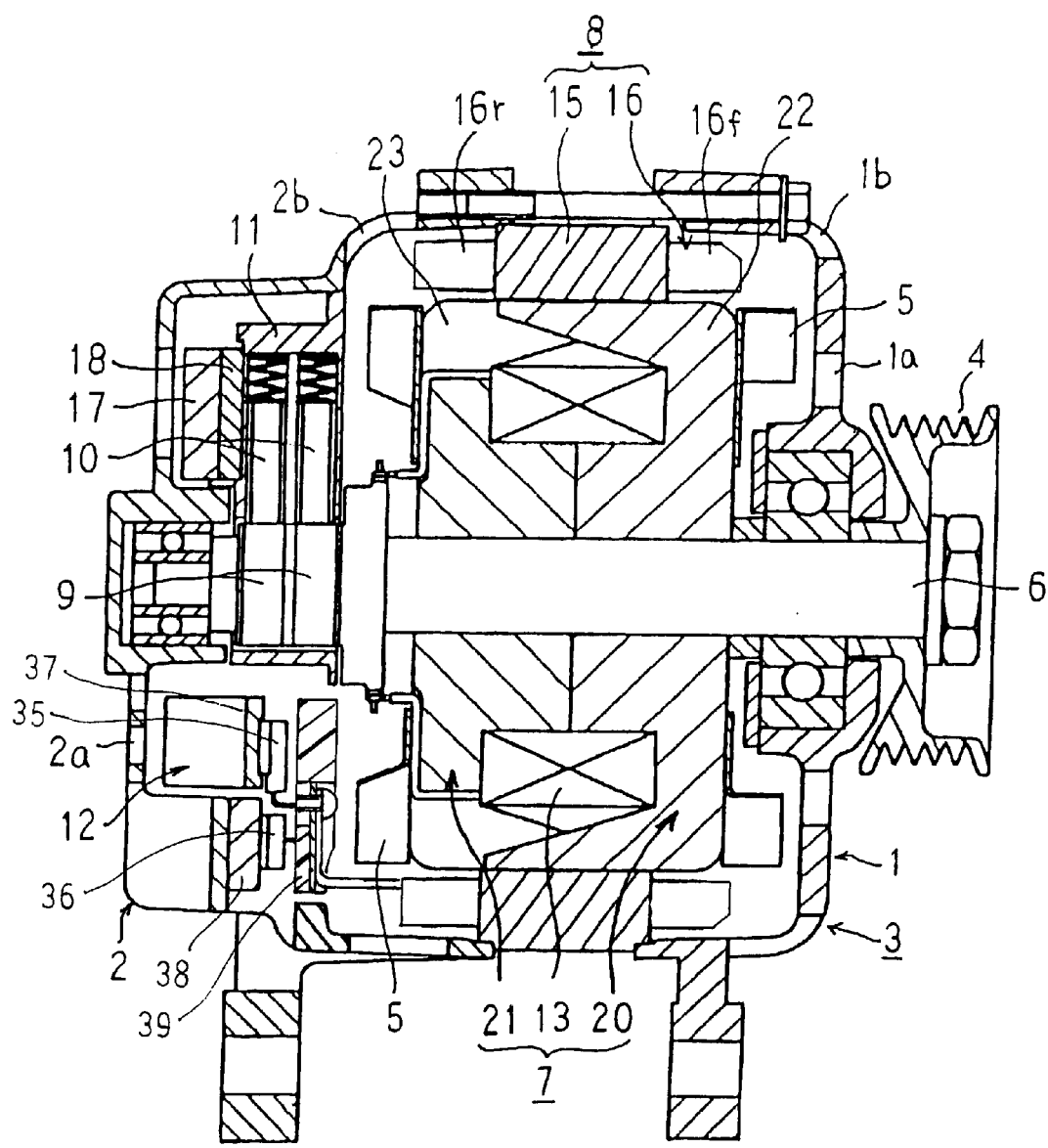
FIG. 17 is a cross section of a conventional automotive alternator.
Figure 18:
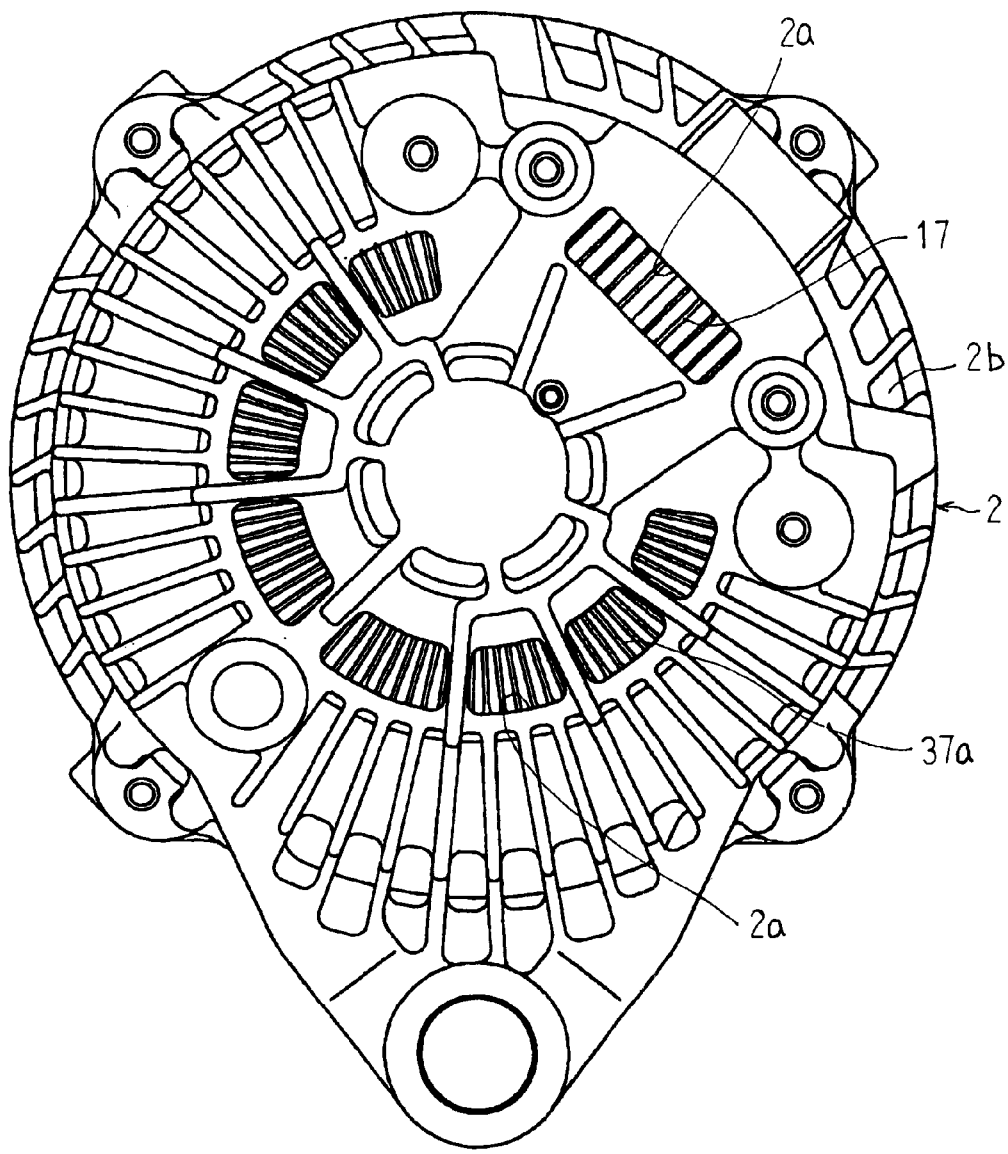
FIG. 18 is a rear end elevation of the conventional automotive alternator.
Figure 19:
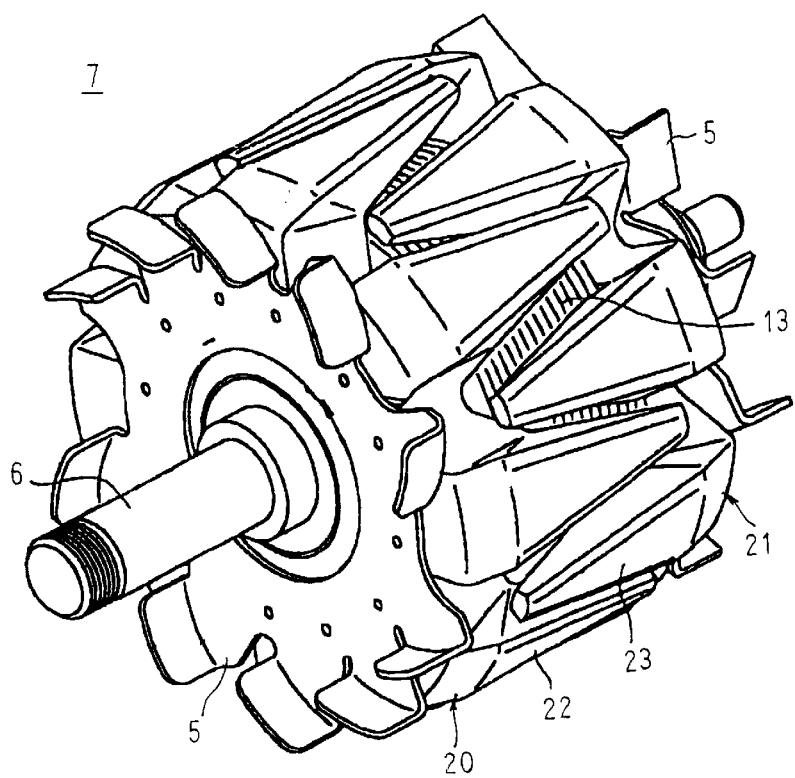
FIG. 19 is a perspective showing a rotor used in the conventional automotive alternator.
Figure 20:
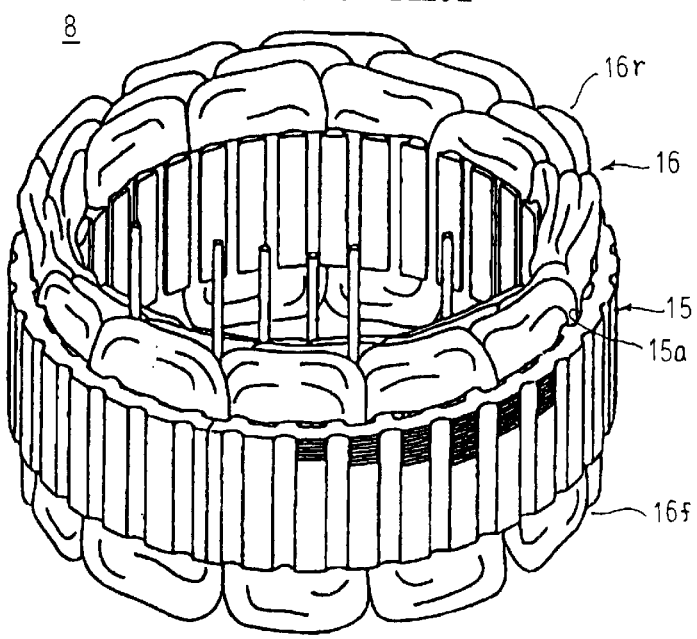
FIG. 20 is a perspective showing a stator used in the conventional automotive alternator.
Figure 21:
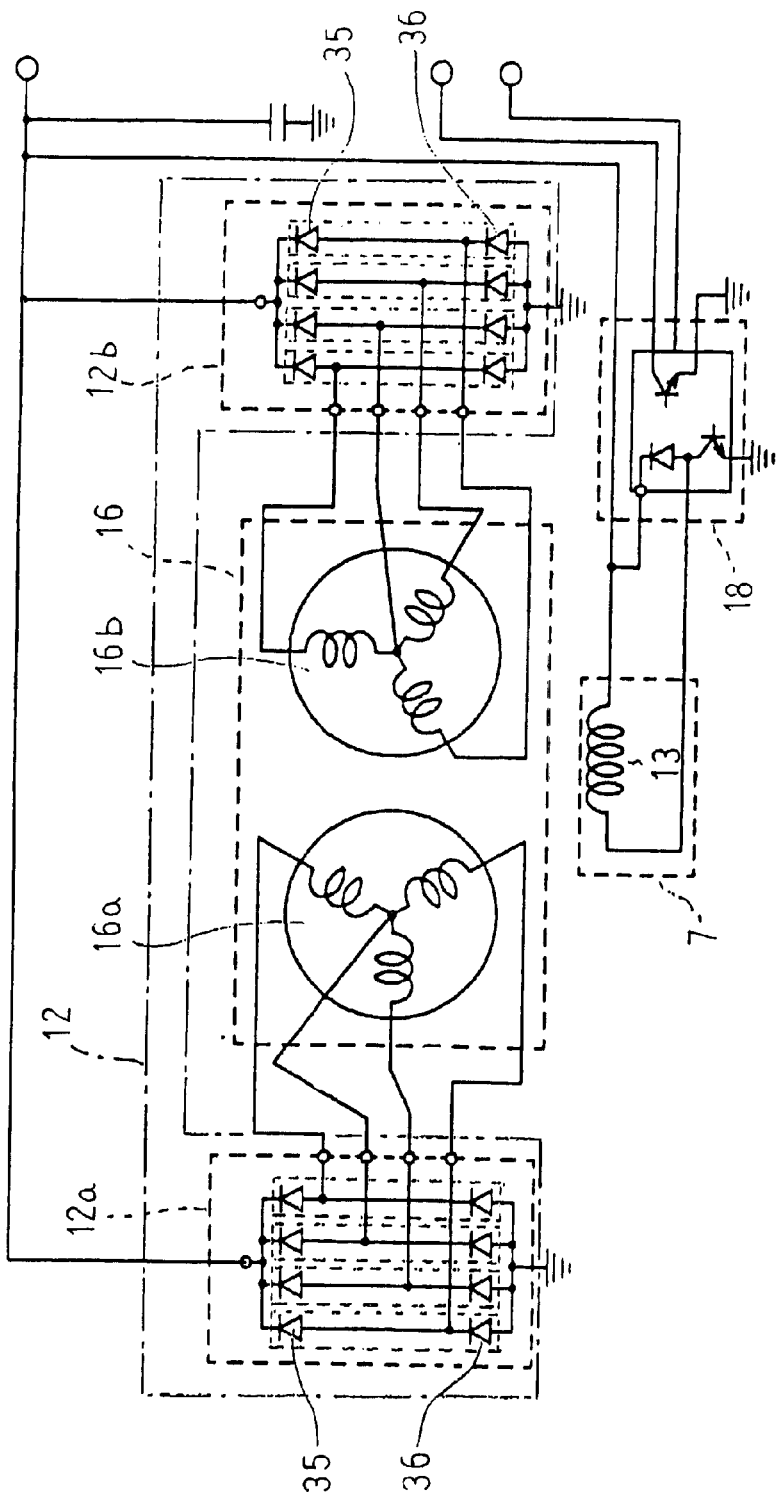
FIG. 21 is a circuit diagram of the conventional automotive alternator.
Figure 22:
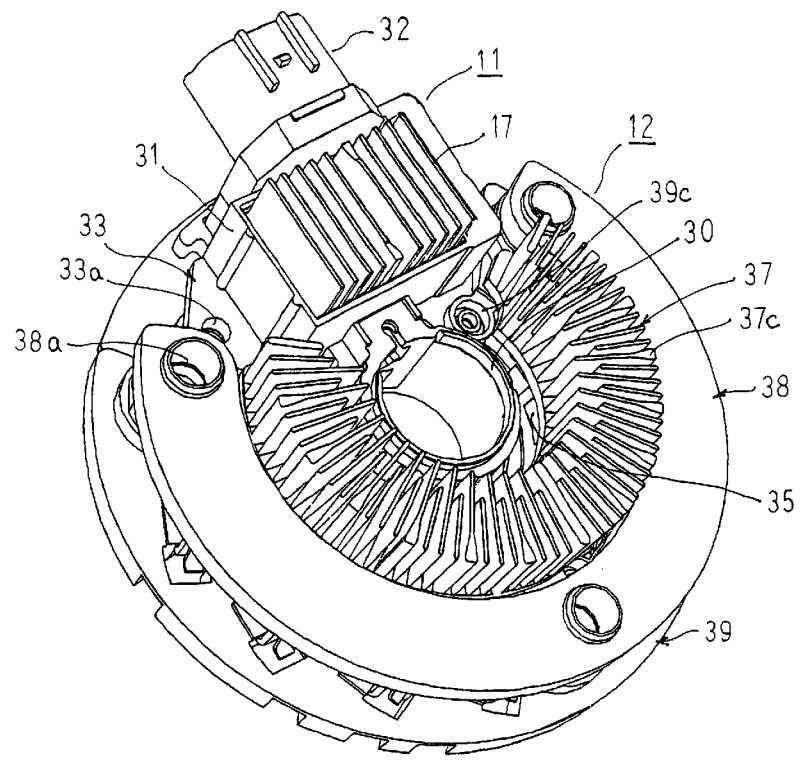
FIG. 22 is a rear perspective of an assembled state of a rectifier and a voltage regulator used in the conventional automotive alternator.
Figure 23:
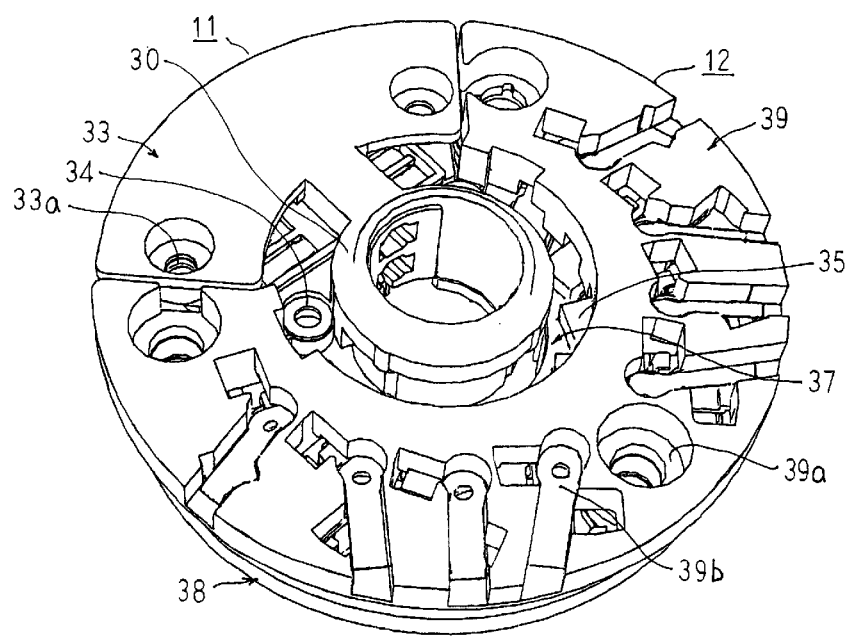
FIG. 23 is a front perspective of the assembled state of the rectifier and the voltage regulator used in the conventional automotive alternator.
Figure 24:
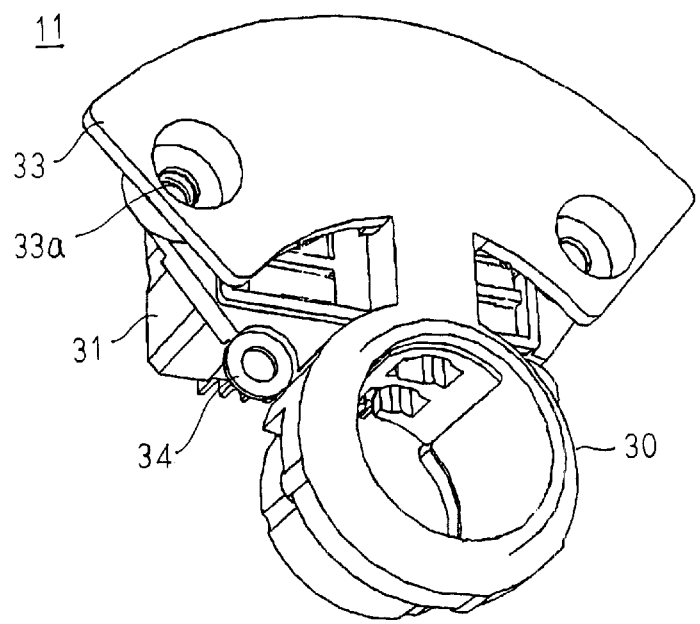
FIG. 24 is a front perspective of a brush holder used in the conventional automotive alternator.
Figure 25:
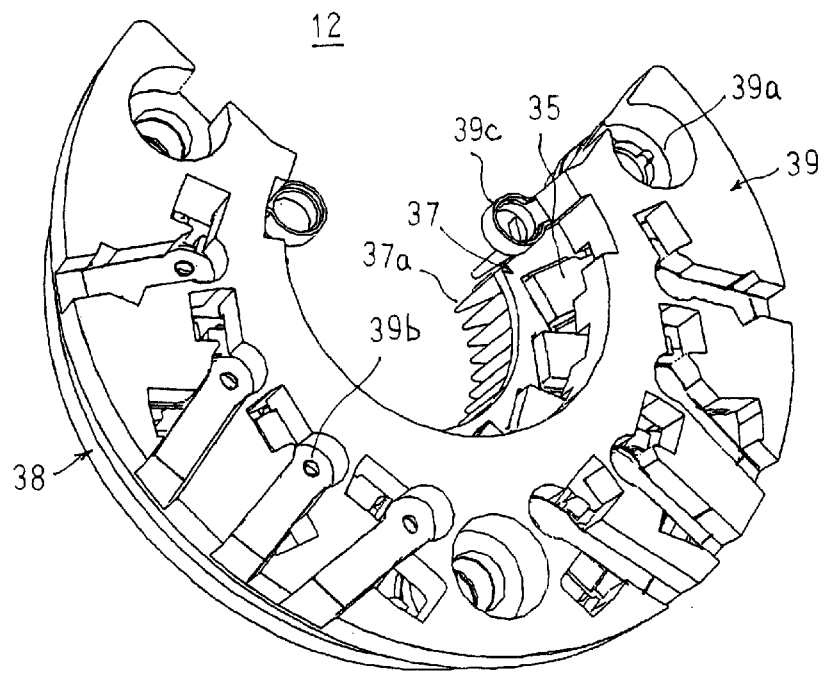
FIG. 25 is a front perspective of the rectifier used in the conventional automotive alternator.
Figure 26:
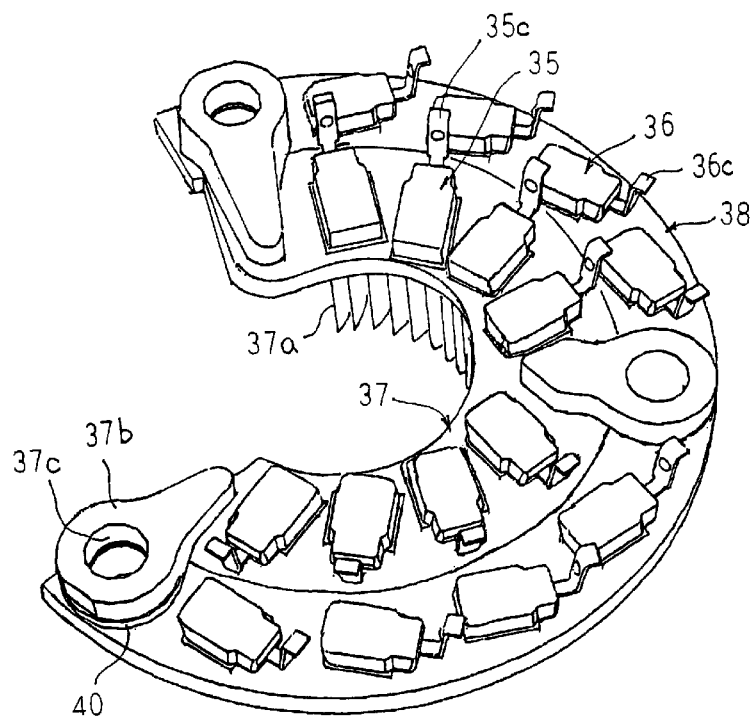
FIG. 26 is a front perspective of a circuit board of the rectifier used in the conventional automotive alternator before mounting.
Figure 27:
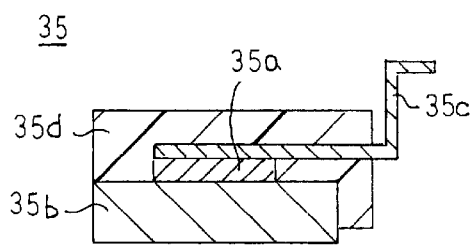
FIG. 27 is a cross section of a first unidirectional conducting component package used in the rectifier of the conventional automotive alternator.
Figure 28:
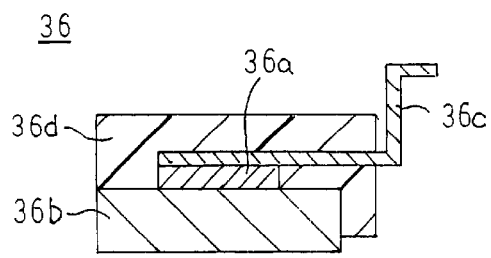
FIG. 28 is a cross section of a second unidirectional conducting component package used in the rectifier of the conventional automotive alternator.

The construction of the stator 8B will be explained here with reference to FIGS. 15 and 16. Moreover, FIG. 16 shows a part of one stator winding phase portion.

The stator 8B is constituted by a cylindrical stator core 15 in which slots 15a extending axially are disposed at a predetermined pitch in a circumferential direction, and a stator winding 16B formed by installing conductor wires so as to fold over outside the slots at an end surface of the stator core 15 and alternately occupy an inner and an outer layer in every sixth slot 15a.

Continuous copper wires 75 coated with electrical insulation are used for the conductor wires which constitute this stator winding 16B. Furthermore, ninety-six slots 15a are disposed in the stator core 15.

In slot groups each constituted by slots 15a lined up at a pitch of six slots (6P), a first winding sub-portion 76a is installed by winding one strand of continuous copper wire 75 into the stator core 15 in a wave shape so as to alternately occupy a third address and a fourth address in every sixth slot 15a, a second winding sub-portion 76b is installed by winding one strand of continuous copper wire 75 into the stator core 15 in a wave shape so as to alternately occupy a fourth address and a third address in every sixth slot 15a, a third winding sub-portion 76c is installed by winding one strand of continuous copper wire 75 into the stator core 15 in a wave shape so as to alternately occupy a first address and a second address in every sixth slot 15a, and a fourth winding sub-portion 76d is installed by winding one strand of continuous copper wire 75 into the stator core 15 in a wave shape so as to alternately occupy a second address and a first address in every sixth slot 15a. Here, the first to fourth winding sub-portions 76a to 76d have one turn each, the second winding sub-portion 76b being inversely wound and offset by an electrical angle of 180° relative to the first winding sub-portion 76a, and the fourth winding sub-portion 76d being inversely wound and offset by an electrical angle of 180° relative to the third winding sub-portion 76c. Furthermore, slot-housed portions 75b of four strands of continuous copper wire 75 are housed in each slot 15a so as to line up in one row in a radial direction (the slot depth direction).

Then, one stator winding phase portion having four turns is constructed by connecting the first to fourth winding sub-portions 76a to 76d installed in each slot group in series. In other words, because there are six slot groups constituted by every sixth slot 15a, six stator winding phase portions are constructed. Next, two three-phase alternating-current windings are constructed by connecting three stator winding phase portions into each of two alternating-current connections. Thus, the stator 8B is obtained, in which the stator winding 16B constituted by the two three-phase alternating-current windings is installed in the stator core 15.

Thus, in the stator winding 16B constructed in this manner, the turn portions 75a (coil ends) of the continuous copper wires 75, which are folded over outside the slots at the end surfaces of the stator core 15, are arranged in neat rows in a circumferential direction so as to form two rows in a radial direction and constitute front-end and rear-end coil end groups 16f and 16r.

In Embodiment 7, the turn portions 75a of the first and second winding sub-portions 76a and 76b each extend outwards at the rear end from the third address of the slots 15a, are folded over outside the slots, and enter the fourth address of the next slot 15a six slots away. Similarly, the turn portions 75a of the third and fourth winding sub-portions 76c and 76d each extend outwards at the rear end from the first address of the slots 15a, are folded over outside the slots, and enter the second address of the next slot 15a six slots away. In other words, the turn portions 75a are each formed into a generally equal shape. Thus, in the front-end and rear-end coil end groups 16f and 16r, because the turn portions 75a are arranged in neat rows in a circumferential direction to form two rows in a radial direction, the front-end and rear-end coil end groups 16f and 16r constitute heat-dissipating portions which are generally even relative to a circumferential direction. Consequently, the heat generated in the stator 8B is dissipated from the rear-end coil end group 16r uniformly relative to the circumferential direction, reducing the influence of heat radiation on the rectifier 120 and the voltage regulator 18, which are disposed on an inner circumferential side of the rear-end coil end group 16r.

Each of the above embodiments is explained with reference to an automotive alternator enabling improved output by using eight unidirectional conducting component packages 35 and 36 to perform three-phase full-wave rectification on the output of the stator winding, which is composed of two three-phase alternating-current windings, and picking up the ripple currents flowing through the neutral points of the three-phase alternating-current windings. However, the present invention may also be applied to an automotive alternator using six unidirectional conducting component packages 35 and 36 to perform three-phase full-wave rectification on output from a stator winding composed of two three-phase alternating-current windings, or to an automotive alternator using three unidirectional conducting component packages 35 and 36 to perform three-phase full-wave rectification on output from a stator winding composed of one three-phase alternating-current winding, or may also be applied to an automotive alternator enabling improved output by using four unidirectional conducting component packages 35 and 36 to perform three-phase full-wave rectification on output from a stator winding composed of one three-phase alternating-current winding, and picking up ripple currents flowing through neutral points of the three-phase alternating-current winding.

In each of the above embodiments, heat-dissipating fins are disposed on the heat sinks, but the heat-dissipating fins are not necessarily required. In cases where heat-dissipating fins are not disposed, the degree of freedom in designing an automotive alternator increases because the degree of freedom in the shape of the heat sinks increases.

In each of the above embodiments, the voltage regulating circuit of the voltage regulator is constructed by mounting electronic components such as IC chips onto the voltage regulator circuit board 18a, but a single-chip regulator may also be used in which a voltage regulator circuit is integrated into a single chip.

In Embodiment 4 above, the bridge circuit is constituted by silicon-based Si-MOSFETs, but the bridge circuit may also be constituted by silicon carbide-based SiC-MOSFETs. In that case, reliability is improved because SiC-MOSFETs have higher voltage tolerance than Si-MOSFETs, giving them sufficient tolerance even against high surge voltages. Furthermore, because the on-state resistance of SiC-MOSFETs is lower than that of Si-MOSFETs, resistance loss is also lower, enabling output from the alternator to be extracted with high efficiency as a rectified output.

The present invention is constructed in the above manner and exhibits the effects described below.

According to one aspect of the present invention, there is provided an automotive alternator including:

a shaft rotatably supported by a bracket;

a rotor fastened to the shaft, the rotor being disposed inside the bracket;

a stator fastened to the bracket so as to envelop an outer circumference of the rotor;

a rectifier for rectifying an alternating-current output of the stator, the rectifier being provided with a rectifier heat sink on which a plurality of semiconductor components is disposed and a rectifier circuit board for connecting the plurality of semiconductor components so as to constitute a bridge circuit;

a voltage regulator for adjusting an output voltage of the rectifier, the voltage regulator being provided with a voltage regulator circuit board on which a voltage regulating circuit is formed and a voltage regulator heat sink on which the voltage regulator circuit board is disposed; and a cooling means for cooling the rectifier and the voltage regulator, wherein the plurality of semiconductor components and the voltage regulator circuit board are supported by a single supporting member and mounted to the bracket, reducing the number of parts, thereby providing an automotive alternator enabling assembly to be improved.

The supporting member may be constructed by integrating the rectifier heat sink and the voltage regulator heat sink, reducing the number of parts and enabling the heat-conducting surface area of the heat sinks to be enlarged, thereby enabling cooling to be improved.

The rectifier heat sink and the voltage regulator heat sink may be integrated by interposing a linking member, the linking member being composed of a material having a coefficient of thermal conductivity less than coefficients of thermal conductivity of the rectifier heat sink and the voltage regulator heat sink, making it less likely that heat will be conducted from high temperature ends to low temperature ends of the rectifier and the voltage regulator.

The cooling means may be a centrifugal fan disposed inside the bracket; and the supporting member may be formed into an annular shape and mounted to the bracket so as to be perpendicular to an axis of the shaft, the plurality of semiconductor components and the voltage regulator circuit board being distributed in a circumferential direction around the shaft, effectively cooling the rectifier and the voltage regulator by a cooling air flow generated by the centrifugal fan.

The cooling means may be constituted by:

a conduit disposed in the bracket; and a coolant distributed through the conduit, effectively cooling the rectifier and the voltage regulator.

The semiconductor components may be constituted by MOSFETs, lowering the amount of heat generated in the rectifier and reducing a temperature difference between the rectifier and the voltage regulator.

The stator may include:

a cylindrical stator core in which slots extending axially are disposed at a predetermined pitch in a circumferential direction; and a stator winding formed by installing conductor wires, each conductor wire being folded over outside the slots at an end surface of the stator core so as to occupy different layers in a slot depth direction in the slots at predetermined slot intervals, wherein folded-over portions of the conductor wires constitute coil ends, and a coil end group of the stator winding is constituted by arranging the coil ends in neat rows in a circumferential direction, heat dissipated from the coil end group as a result of heat generated in the stator being circumferentially uniform, thereby limiting the influence of heat radiated from the coil end group on the rectifier and the voltage regulator.

What is claimed is:

1. An automotive alternator comprising:

a shaft rotatably supported by a bracket;

a rotor fastened to said shaft, said rotor being disposed inside said bracket;

a stator fastened to said bracket so as to envelop an outer circumference of said rotor;

a rectifier for rectifying an alternating-current output of said stator, said rectifier being provided with a rectifier heat sink on which a plurality of semiconductor components is disposed and a rectifier circuit board for connecting said plurality of semiconductor components, wherein said semiconductor components constitute a bridge circuit;

a voltage regulator for adjusting an output voltage of said rectifier, said voltage regulator being provided with a voltage regulator circuit board on which a voltage regulating circuit is formed and a voltage regulator heat sink on which said voltage regulator circuit board is disposed; and a cooling means for cooling said rectifier and said voltage regulator, wherein said plurality of semiconductor components and said voltage regulator circuit board are supported by a single supporting member and mounted to said bracket, and wherein said supporting member is constructed by integrating said rectifier heat sink and said voltage regulator heat sink.

2. The automotive alternator according to claim 1 wherein said rectifier heat sink and said voltage regulator heat sink are integrated by interposing a linking member, said linking member being composed of a material having a coefficient of thermal conductivity less than coefficients of thermal conductivity of said rectifier heat sink and said voltage regulator heat sink.

3. The automotive alternator according to claim 1 wherein:

said cooling means is a centrifugal fan disposed inside said bracket; and said supporting member is formed into an annular shape and mounted to said bracket so as to be perpendicular to an axis of said shaft, said plurality of semiconductor components and said voltage regulator circuit board being distributed in a circumferential direction around said shaft.

4. The automotive alternator according to claim 1 wherein said cooling means is constituted by:

a conduit disposed in said bracket; and a coolant distributed through said conduit.

5. The automotive alternator according to claim 1 wherein said semiconductor components are constituted by MOSFETs.

6. The automotive alternator according to claim 1 wherein said stator comprises:

a cylindrical stator core in which slots extending axially are disposed at a predetermined pitch in a circumferential direction; and a stator winding formed by installing conductor wires, each conductor wire being folded over outside said slots at an end surface of said stator core so as to occupy different layers in a slot depth direction in said slots at predetermined slot intervals, wherein folded-over portions of said conductor wires constitute coil ends, and said coil ends are arranged in rows in a circumferential direction to form a coil end group of said stator winding.

* * * * *